(12) United States Patent
Kipersztok et al.

(10) Patent No.: US 7,644,053 B2
(45) Date of Patent: ***Jan. 5, 2010

(54) SYSTEM, METHOD, AND COMPUTER PROGRAM PRODUCT FOR COMBINATION OF COGNITIVE CAUSAL MODELS WITH REASONING AND TEXT PROCESSING FOR KNOWLEDGE DRIVEN DECISION SUPPORT

(75) Inventors: Oscar Kipersztok, Redmond, WA (US); Philip Harrison, Seattle, WA (US)

(73) Assignee: The Boeing Company, Chicago, IL (US)

( * ) Notice: Subject to any disclaimer, the term of this patent is extended or adjusted under 35 U.S.C. 154(b) by 516 days.

This patent is subject to a terminal disclaimer.

(21) Appl. No.: 11/070,452

(22) Filed: Mar. 2, 2005

(65) Prior Publication Data

US 2005/0197992 A1    Sep. 8, 2005

Related U.S. Application Data

(60) Provisional application No. 60/549,823, filed on Mar. 3, 2004.

(51) Int. Cl.
*G06N 5/02* (2006.01)
(52) U.S. Cl. .......................................... 706/46; 706/50
(58) Field of Classification Search .................. 706/46, 706/50
See application file for complete search history.

(56) References Cited

U.S. PATENT DOCUMENTS

| 6,029,195 | A | 2/2000 | Herz |
| 6,574,537 | B2 | 6/2003 | Kipersztok et al. |
| 2004/0019575 | A1 | 1/2004 | Talbot et al. |
| 2005/0028033 | A1 | 2/2005 | Kipersztok et al. |

FOREIGN PATENT DOCUMENTS

WO    WO 02/101555 A2    12/2002

(Continued)

OTHER PUBLICATIONS

Patrick J. Talbot "Semantic Networks: A Unifying Framework for Multistrategy Reasoning" Technology Review Journal Spring/Summer 2003.*

(Continued)

*Primary Examiner*—David R Vincent
*Assistant Examiner*—Lut Wong
(74) *Attorney, Agent, or Firm*—Alston & Bird LLP

(57) ABSTRACT

A system, method, and computer program product for combining causal domain models with reasoning and text processing for knowledge driven decision support are provided. A knowledge driven decision support system is capable of creating a domain model, extracting and processing quantities of text according to the domain model, and generating understanding of the content and implications of information sensitive to analysts. An interface may be used to receive input to model complex relationships of a domain, establish implications of interest or request a query, and update the causal model. A processing element can capture and process text into text profiles by incorporating the domain model and process the text profiles in accordance with the domain model by applying formal reasoning to the information to derive trends, predict events, or arrive at other query results. An output element can provide a user the resulting information related to the domain model.

29 Claims, 17 Drawing Sheets

FOREIGN PATENT DOCUMENTS

WO    WO 2004/042493 A2    5/2004

OTHER PUBLICATIONS

Technology review journal call for papers for spring/summer 2003.*
"Technology Review Journal" vol. 15, No. 1.*
Kipersztok et al ("Evidence-based Bayesian Networks Approach to Airplane Maintenance" IEEE 2002.*
Clark et al ("A Knowledge-Rich Approach to Understanding Text about Aircraft Systems" 2002).*
Talbot et al ("computation antiterrorism solutions using a general purpose evidence fusion engine" summer 2002).*
*Forecasting Intraday Stock Price Trends with Text Mining Techniques*, M. Mittermayer, Proceedings of the 37th Hawaii International Conference on System Sciences, IEEE, 2004, pp. 1-10.
*Analysis of Daily Business Reports Based on Sequential Text Mining Method*, S. Sakurai et al., IEEE International Conference on Systems, Man and Cybernetics, 2004, pp. 3279-3284.
*Text Mining: The New Competitive Intelligence Frontier. Real Cases in Industrial, Banking and Telecom/SMEs World.*, A. Zanasi, pp. 1-17.

* cited by examiner

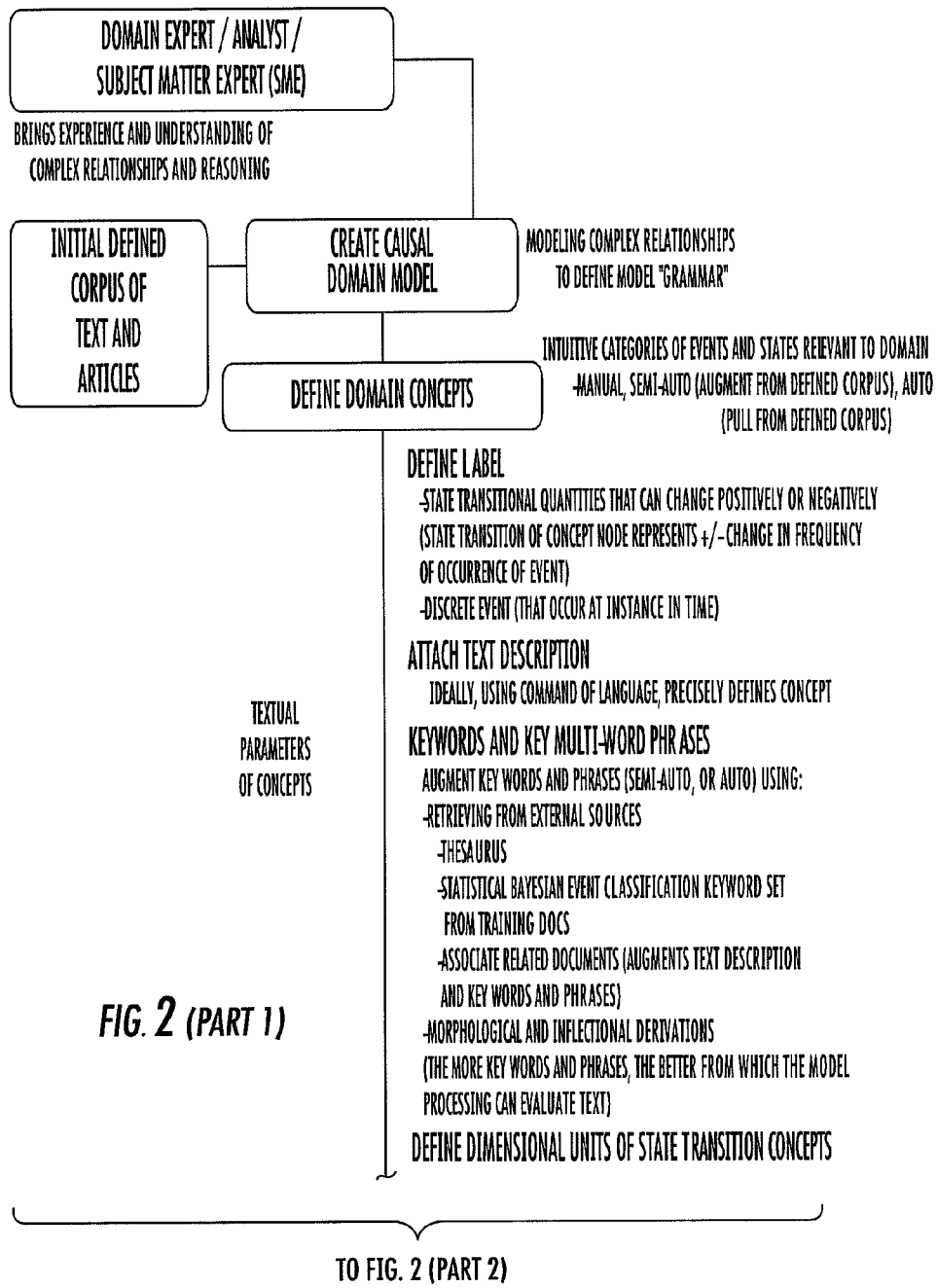
FIG. 2 (PART 1)
TO FIG. 2 (PART 2)

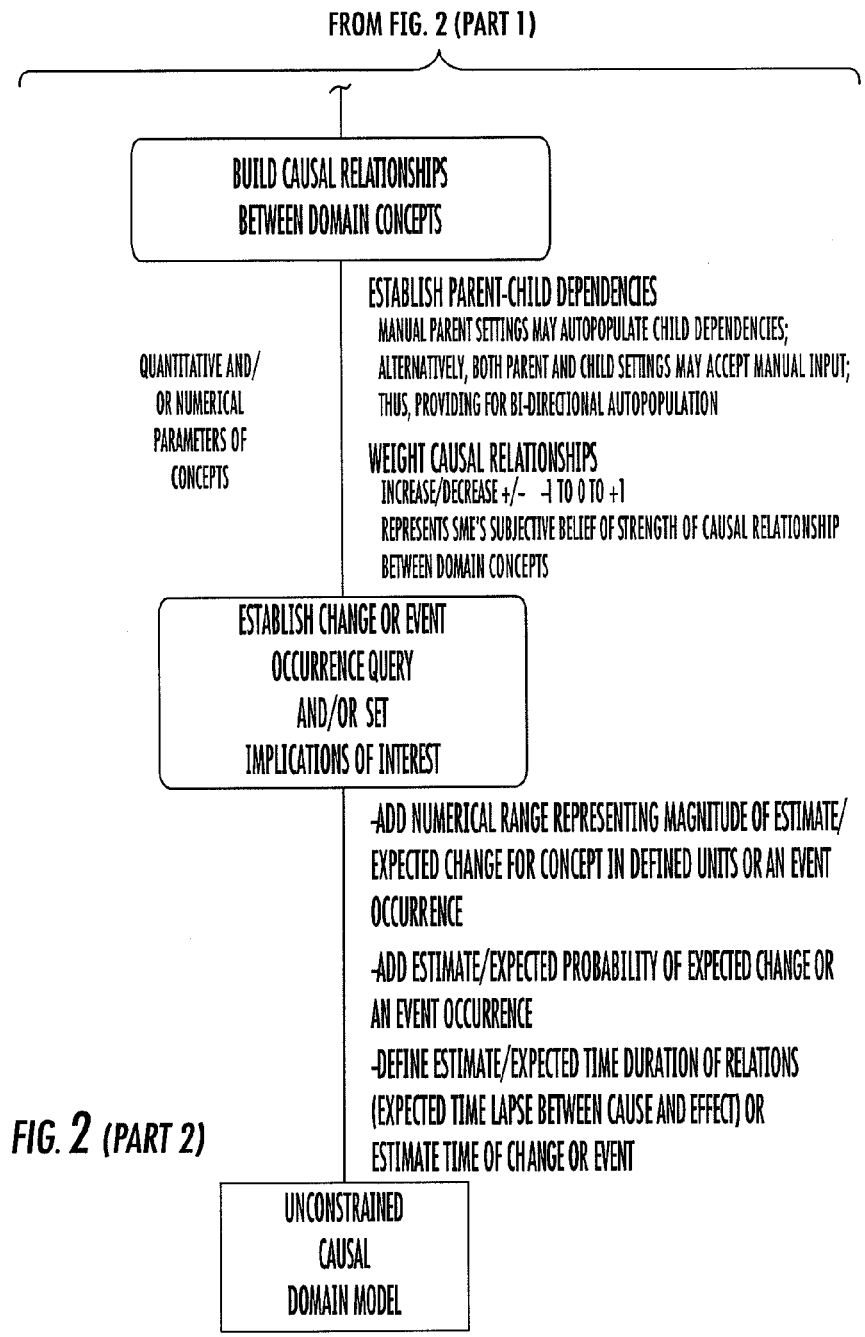
FIG. 2 (PART 2)

ENTER A CONCEPT
TYPE IN A CONCEPT NAME OR SELECT A CONCEPT:
OCCURRENCE OF ACCIDENTS AND INCIDENTS

AIRLINE FLIGHT CREW ERRORS
AIRLINE MAINTENANCE ERRORS
AIRLINE PROFIT
AIRLINE SAFETY BUDGET
ATC ERRORS
DEMAND FOR AIRPLANES
DEMAND FOR FLYING
GOVERNMENT OVERSIGHT
MALICIOUS INTERFERENCE
MANUFACTURER ERRORS
MANUFACTURER PROFIT
MANUFACTURER SAFETY BUDGET
OCCURRENCE OF ACCIDENTS AND INCIDENTS
PUBLIC CONCERN ABOUT SAFETY
WORLD ECONOMY

RANGE OF DISCOURSE
OCCURRENCE OF ACCIDENTS AND INCIDENTS

UNITS PER TIME
ENTER LABEL DEFINING UNITS: NO INCIDENTS
PICK TIME RANGE FOR UNITS: QUARTER

RANGE FOR CHANGE
ORDER OF MAGNITUDE FOR CHANGE 1,000
SPECIFY DETAILED RANGE:
250    500    750    1000

IS CHANGE SYMMETRIC?
⦿ YES (-N TO N)   ○ NO (M TO N)
ORDER OF MAGNITUDE CHANGE FOR DECREASE: PICK FROM 1, 10, 100, 1000,... FOR WHAT AMOUNTS TO A DECREASE ▸
SPECIFY DETAILED RANGE:
25% MAX    50% MAX    75% MAX    MAXVALUE

NO. INCIDENTS/ QUARTER RANGE = +-3

FIG. 2C

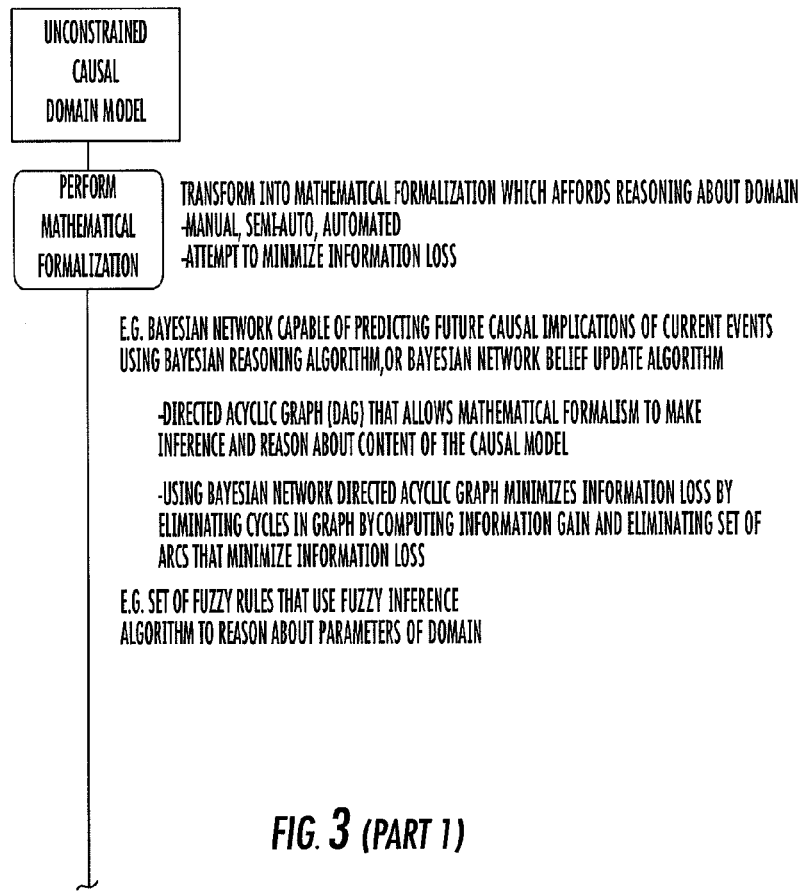
FIG. 3 (PART 1)
TO FIG. 3 (PART 2)

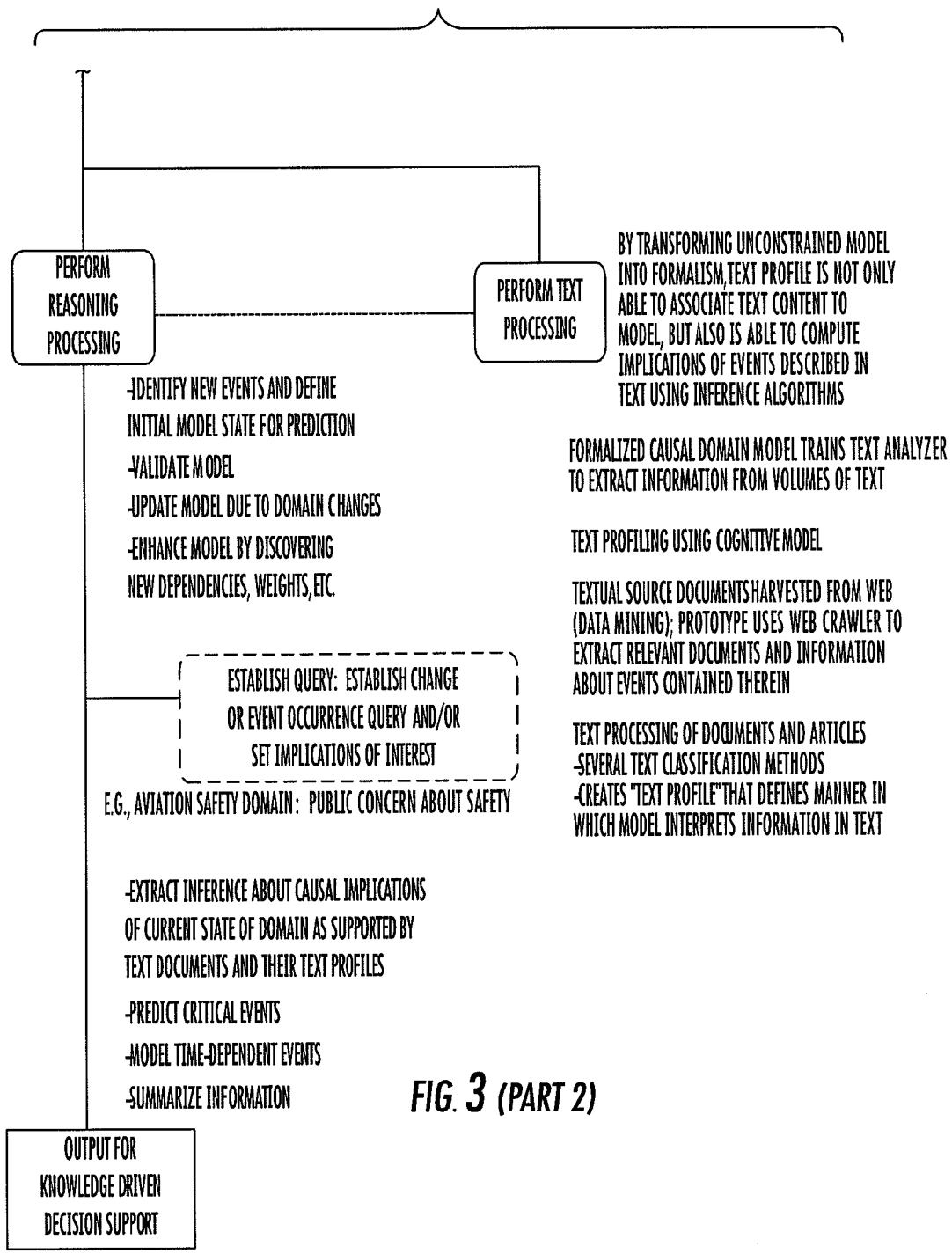

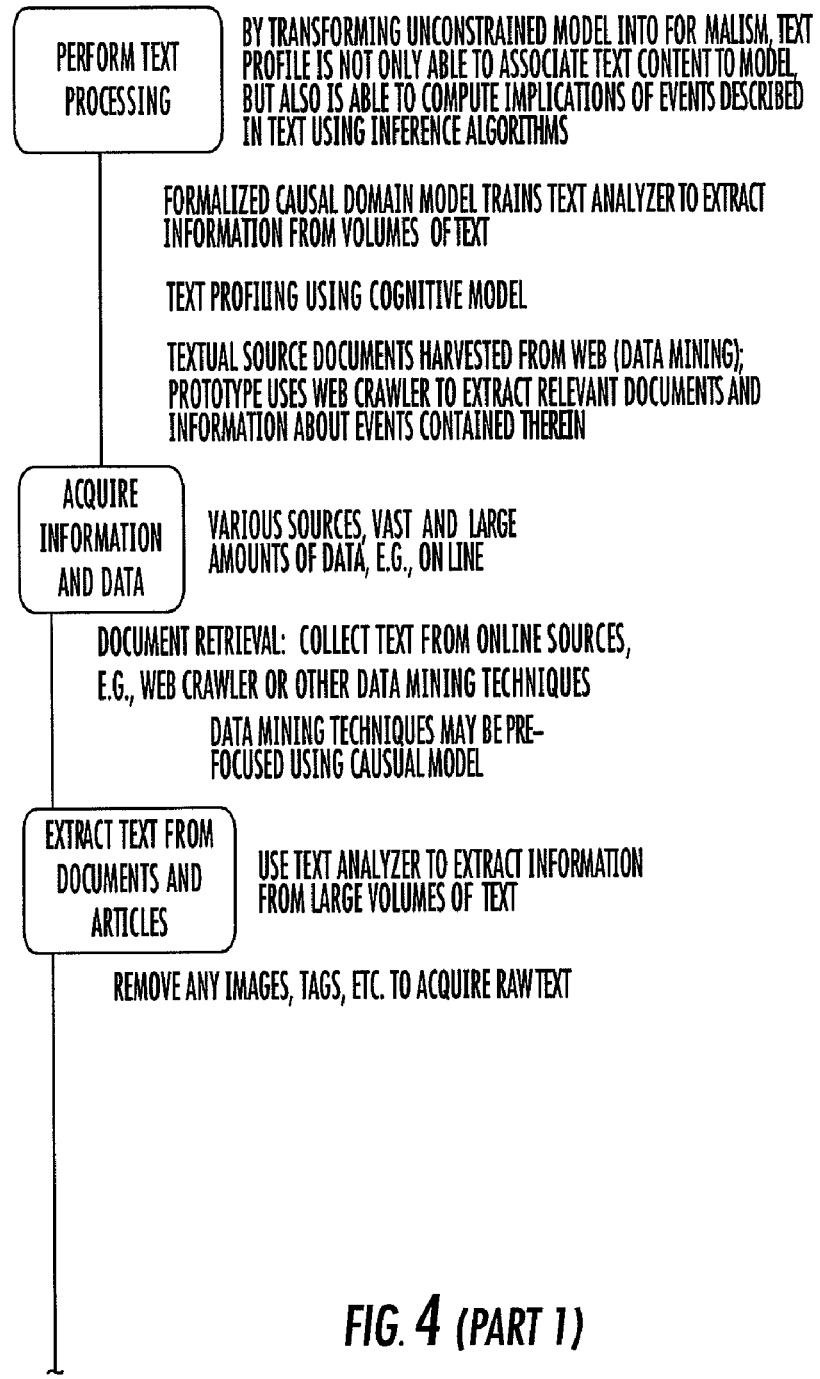
FIG. 4 (PART 1)
TO FIG. 4 (PART 2)

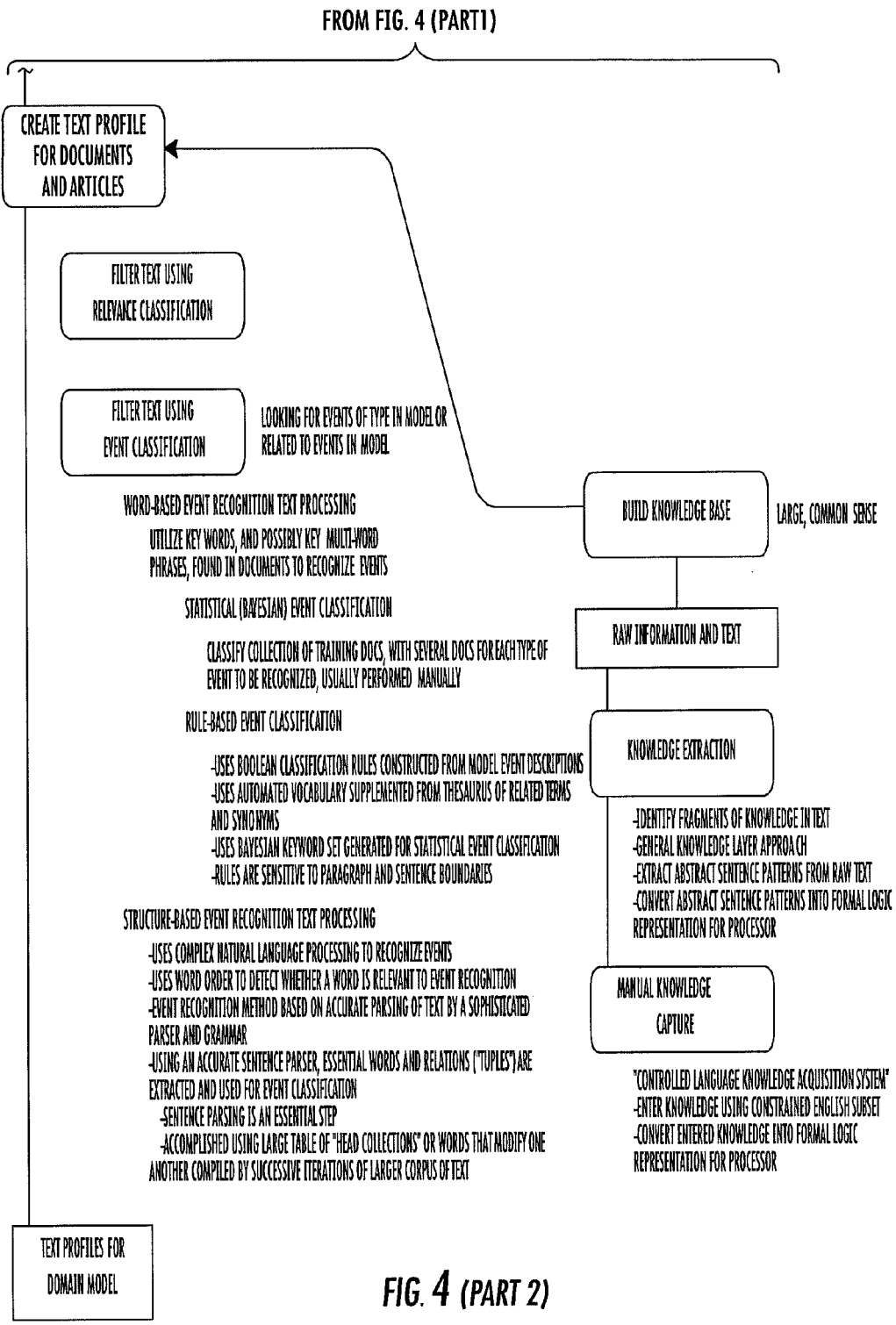
FIG. 4 (PART 2)

SYSTEM, METHOD, AND COMPUTER PROGRAM PRODUCT FOR COMBINATION OF COGNITIVE CAUSAL MODELS WITH REASONING AND TEXT PROCESSING FOR KNOWLEDGE DRIVEN DECISION SUPPORT

CROSS-REFERENCE TO RELATED APPLICATION

This application claims priority to and the benefit of the filing date of provisional application entitled "System, Method, and Computer Program Product for Combination of Cognitive Causal Models with Reasoning and Text Processing for Knowledge Driven Decision Support," assigned Ser. No. 60/549,823 and filed Mar. 3, 2004, which is incorporated by reference.

FIELD OF THE INVENTION

The present invention relates generally to decision support systems and methods, and, more particularly, to systems, methods, and computer program products for combining cognitive causal models with reasoning and text processing for knowledge driven decision support.

BACKGROUND

Information has quickly become voluminous over the past half century with improved technologies to produce and store increased amounts of information and data. The Internet makes this point particularly clear. Not only does the Internet provide the means for increased access to large amounts of different types of information and data, but when using the Internet, it becomes clear how much information has been produced and stored on presumably every possible topic. While one problem produced by this large amount of information is the ability to access a particular scope of information, another significant problem becomes attempting to analyze an ever-increasing amount of information, even when limited to a particular domain.

Analysts are presented with increasing volumes of information and the continued importance to analyze all of this information, not only possibly in a particular field of study or domain, but possibly also information from additional domains or along the fringes of the focus domain. Where an information domain presents numeric data, the increased volume of information may not present a significant constraint on an analyst. However, in a domain where the information available is beyond the amount humans can potentially process, particularly in domains involving socioeconomic and political systems and of strategic and competitive nature requiring strategic reasoning, decision makers and analysts can be prevented from fully understanding and processing the information.

Even before the quantity of information becomes an issue, it takes time for an analyst to compose a framework and understanding of the current state of a particular domain. Particular issues are increasingly complex and require a deep understanding of the relationships between the variables that influence a problem. Specific events and past trends may have even more complex implications on and relationships to present and future events. Analysts develop complex reasoning that is required to make determinations based upon the information available and past experience, and decision makers develop complex reasoning and rationale that is required to make decisions based upon the information and determinations of analysts and the intended result. These factors make it difficult for analysts and decision makers to observe and detect trends in complex business and socio-political environments, particularly in domains outside of their realm of experience and knowledge.

However, further burdening analysts and decision makers, increasing amounts and complexities of information available to analysts and decision makers require significantly more time to process and analyze. And much needed information to predict trends may be found in streams of text appearing in diverse formats available, but buried, online. Thus, analysts may be forced to make determinations under time constraints and based on incomplete information. Similarly, decision makers may be forced to make decisions based on incomplete, inadequate, or, simply, poor or incorrect information or fail to respond to events in a timely manner. Such determinations and decisions can lead to costly results. And a delay in processing information or an inability to fully process information can prevent significant events or information from being identified until it may be too late to understand or react.

No tools are known to be available at present for capturing the knowledge and expertise of an analyst or domain expert directly in a simple and straightforward manner. And, currently, domain experts rely upon knowledge engineers and other trained applications professionals to translate their knowledge into a reasoning representation model. This model can then be employed in an automated fashion to search and analyze the available information. To analyze the information properly, the model must be accurate. Unfortunately, these methods of forming models and analyzing information can be time consuming, inefficient, inaccurate, static, and expensive.

SUMMARY OF THE INVENTION

Embodiments of the present invention provide improved systems, methods, and computer program products for cognitive causal models with reasoning and text processing for knowledge driven decision support. Other embodiments of the present invention provide systems to gather and process large amounts of text that may be scattered among many sources, including online, and to generate basic understanding of the content and implications of important information sensitive to analysts or domain experts and decision makers, captured in a timely manner and made available for strategic decision-making processes to act upon emerging trends.

Embodiments of the present invention combine a causal domain model, a model encompassing causal relationships between concepts of a particular domain, with text processing in different ways. For example, a domain expert creating a causal model can use an initial defined corpus of text and articles to aid or assist in creation of the causal domain model.

Additional interaction between a causal domain model and text processing may include the validation of the creation of a causal domain model by processing an initial corpus of text and articles to determine whether the causal domain model has been created in a manner acceptable to the domain expert such that the interaction of the causal domain model and the text processing, and possibly also the reasoning processing, results in the expected or intended output. This validation process may be accomplished at various points after the causal domain model has been created as a corpus of articles changes over a period of time to reflect the present state of the domain. In this manner, a domain expert or user may update the causal domain model as desired.

Systems for assisting knowledge driven decision support are provided that include a domain model defining at least two domain concepts and at least one causal relationship between the domain concepts, a text processing tool capable of using at least one domain concept of the domain model to analyze at least one document, and a reasoning tool for employing the domain model by using at least one domain concept and one causal relationship of the domain concept to analyze the at least one document for determining a result. The reasoning tool is capable of interacting with the text processing tool to perform text processing to employ the domain model. A system for assisting knowledge driven decision support may include a text acquisition tool as part of the text processing tool. An embodiment of the system of the present invention may also include a data mining tool, a document retrieval tool, and a text extraction tool as part of the text acquisition tool. A further embodiment of a system of the present invention may include a text profiling tool capable of analyzing text with a domain model to create text profiles of acquired text as part of a text acquisition tool. An embodiment of a system of the present invention may also include a transformation routine capable of transforming a domain model into a mathematical formalization of the domain model as part of a reasoning tool. In addition, an external database, such as a common sense knowledge base, may be used by an embodiment of a system of the present invention as part of a text processing tool or with a reasoning tool. External data, such as a knowledge base, may be acquired by extracting knowledge from a corpus of text or by manually capturing knowledge where the external data is transformed into a formal logic representing the extracted or captured knowledge. A system may also include an interface capable of receiving input, such as a graphical user interface, for creating a domain model.

Also provided are knowledge driven decision support systems that provide for analyzing large amounts of textual data. A knowledge driven decision support system may include an interface for receiving inputs related to the creation of a causal domain model, a processing portion of a computer system, and an output element. A processing portion of a computer system may provide for a transformation of a causal domain model into a mathematical formalization. A processing portion of a computer system may acquire documents and processed text of the acquired documents in accordance with the causal domain model to create text profiles. A processing portion of a computer system may also perform reasoning analysis upon text profiles to derive a result using a mathematical formalization of a causal domain model. An interface may be capable of receiving input related to the derivation of a result by a processing portion of a computer system. Such a system can be used to define a query or set of implications of interest for the causal domain model for which a result may be obtained. A query typically refers to an inquiry for resulting information. An implication of interest or set of implications of interest generally refers to identifying a particular trend or event for which a triggering event or threshold level may be established to alert a domain expert or user. A query and a set of implications of interest are collectively referred to in general herein as a query. A causal domain model for a knowledge driven decision support system may include numerous domain concepts or nodes interconnected by causal relationships or arcs. Causal relationships may be defined by user input, such as a domain expert providing the specific causal relationship, and possibly also defined by quantitative or numerical weights for the relationships. Causal relationships of a domain model may also be suggested or established by processing of text or performing reasoning analysis of text based on the domain model.

In addition, corresponding methods and computer program products are provided. A domain model may be modified to define a query or to update the domain model. The domain model and text and/or reasoning processing may be used to validate the domain model. The processing of acquired text may include relevance filtering to acquire text that is relevant to a domain model. Similarly, event filtering may be used as part of processing text to identify text which includes events or key words and phrases which are associated with the domain model.

BRIEF DESCRIPTION OF THE DRAWING(S)

FIG. 2 is a diagram of creating a causal domain model of the present invention.

FIG. 2C is a pictorial representation of a graphical user interface for defining dimensional units of domain concepts for creating a causal domain model.

FIG. 3 is a diagram of reasoning processing.

FIG. 4 is a diagram of text processing.

DETAILED DESCRIPTION

The present inventions will be described more fully with reference to the accompanying drawings. Some, but not all, embodiments of the invention are shown. The inventions may be embodied in many different forms and should not be construed as limited to the described embodiments. Like numbers refer to like elements throughout.

The present invention can be described in terms of concepts of human language learning. For example, a subject matter expert (SME) or domain expert or analyst, hereinafter generally described as a domain expert, has existing knowledge and understanding of a particular domain. The domain expert will recognize and understand specific domain concepts and associated keywords and key multi-word phrases. These domain concepts and key words and phrases can be described as the vocabulary of the domain. Similarly, the domain expert will recognize and understand causal relationships between concepts of the domain. These relationships can be described as the grammar of the domain. Together, the domain concepts and causal relationships define the domain model. The domain model can be described as the language of the domain, defined by the vocabulary and grammar of the domain. The combination of a causal domain model and text and reasoning processing presents a new approach to probabilistic and deterministic reasoning.

Embodiments of systems, methods and computer program products of the present invention are described with respect to airline safety. However, the present invention may also be used in many domains and for a variety of applications, including, for example, competitive intelligence, homeland security, strategic planning, surveillance, reconnaissance, market and business segments, and intellectual property.

Figure 1:
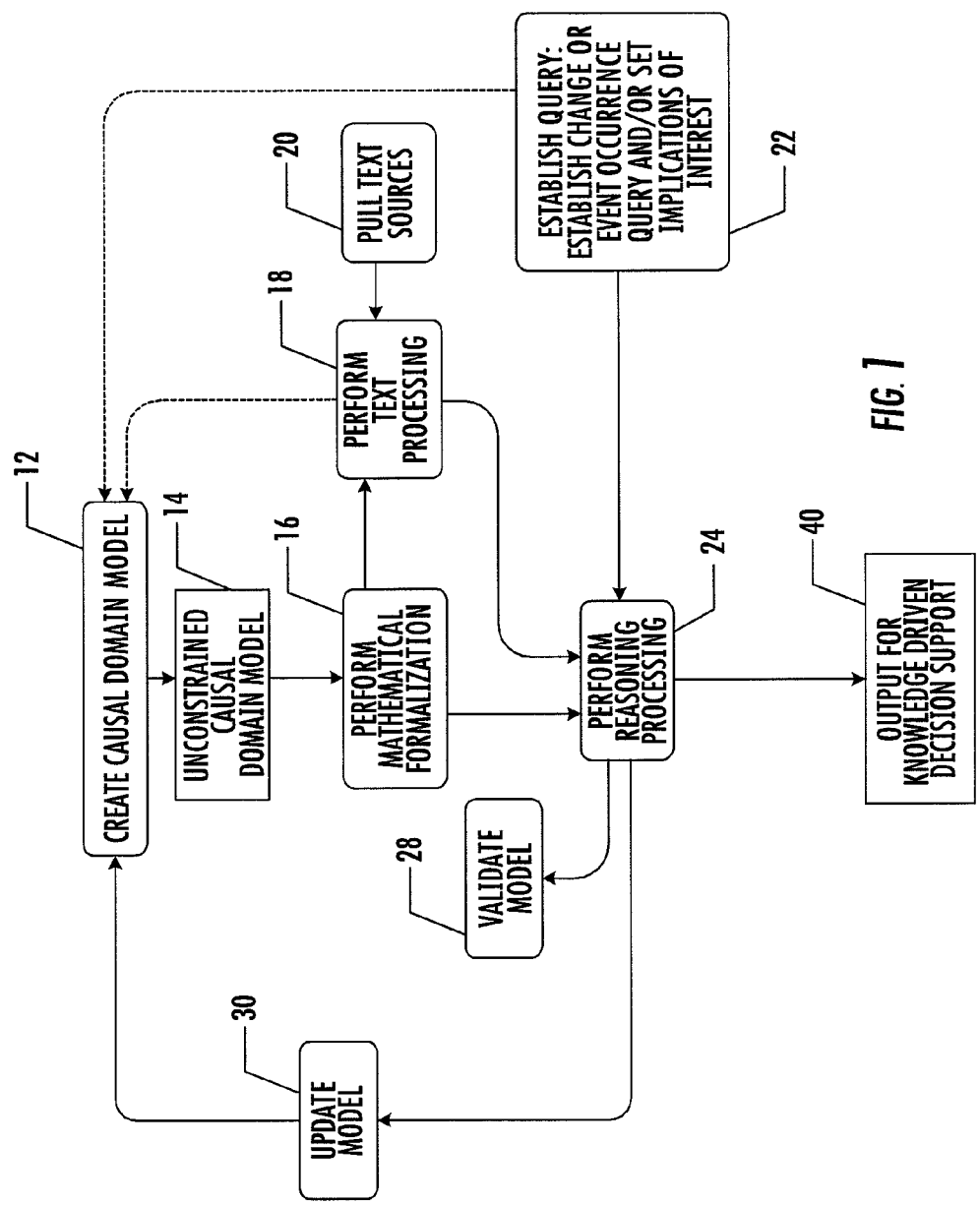
FIG. 1 is a diagram combining a causal domain model with text and reasoning processing.

Although embodiments of the present invention may proceed in various orders and commence with different routines, the embodiment of combining a causal domain model with text and reasoning processing shown in and described with respect to FIG. 1 begins with creation of a causal domain model, as shown at block 12. A causal domain model is a model encompassing causal relationships between concepts of a particular domain. A causal domain model may also include further descriptive information and refinements of the causal relationships, as described further below. The result of creating a causal domain model is an unconstrained causal domain model 14. Mathematical algorithms cannot operate upon the unconstrained form of the domain model 14; thus, the unconstrained causal domain model 14 must be formalized into a mathematical formalization of the unconstrained causal domain model, as shown at block 16. Once a mathematical formalization is created, text processing and reasoning processing may be performed in accordance with the domain model, as shown at blocks 18 and 24. The text and reasoning processing may be used first to validate the model, as shown at block 28, for example, to insure that the model has been created as desired, the mathematical formalization is accurate, and text processing and reasoning processing are performing as expected, as described further below. If necessary or optionally as described below, the causal domain model may be updated for correction or improvement, as shown at block 30. When the proper domain model is established, text sources may be acquired, as shown at block 20, for text processing, and a query may be established for reasoning processing, as shown at block 22. Using the formalization of the causal domain model and the processing methods, the present invention provides an output for knowledge driven decision support 40. The previously described concepts of FIG. 1 are further described in FIGS. 2, 3, and 4.

I. Creating a Causal Domain Model

Rather than a domain expert working with a knowledge engineer to analyze data under the direction of the domain expert, a domain expert may use the present invention to create a causal domain model as shown in FIG. 2. Using the present invention, a domain expert can bring experience and understanding of complex relationships and reasoning to an analytical tool without the need for a knowledge engineer. A task of the domain expert is to create a causal domain model for a particular domain by modelling these complex relationships to define a model grammar that may be used for text and reasoning processing. An interface may be used to assist the domain expert and simplify the creation of the causal domain model. Examples of a graphical user interface and a display output are provided below. However, the present invention may include other interfaces and outputs, and, in one example embodiment, may include input via the Internet, representing embodiments of interfaces that may accept input indirectly, and an email output function, representing embodiments of outputs that may advantageously alert a user at a time after a query has been requested and perhaps repeatedly as new events occur or are thought to have been identified, such as instances in which a user has identified trends and thresholds relating to the public concern for airline safety and where a system embodying the present invention identifies such a trend or threshold and emails to inform the user.

A graphical user interface (GUI) may be used by a domain expert to easily and rapidly create a causal domain model. The graphical user interface, and other interfaces, may use commonalities and uniformity to allow for capture of complex causal dependencies by entry of the same type of information attached to each concept, regardless of the semantic meaning of the concept. For example, a graphical user interface may ensure that the causal relationships of the model are correctly established. A graphical user interface provides a domain expert the ability to build and refine a causal domain model in a manner that creates a causal domain model that may be formalized and used for analyzing information related to the domain. Creating a causal domain model includes defining domain concepts. Domain concepts are intuitive categories of events and states relevant to the domain. For example, with reference to FIG. 2A, "Airline Cost of Accidents and Incidents" and "Detection of Faulty Components" are intuitive categories of events and states relevant to the domain of airline safety, particularly relevant to public concern about airline safety. The concepts may be defined manually, semi-automatically, or automatically. If defined manually, a domain expert may provide the information about the concept. For example, a domain expert may identify and describe the domain and concepts thereof using labels, phrases, and/or textual names. A domain expert creating a casual model can use an initial defined corpus of text and articles to aid or assist in creation of the causal domain model. If defined semi-automatically, concepts may be identified by text and/or reasoning processing algorithms, as described further below, from a defined corpus and selectively accepted by a domain expert. For example, text and/or reasoning processing may identify concepts of a domain from relevance classification, event occurrence, and/or reasoning algorithms that may then be selected or rejected by a domain expert. If domain concepts are defined automatically, the concepts may be pulled from a defined corpus of text and automatically accepted as domain concepts for the causal domain model. Similarly, an initial defined corpus of text and articles may be mined manually, semi-automatically, or automatically to assist in building the model. For instance, the initial defined corpus of text and articles may be mined automatically to extract key words and phrases with increased relevance and to identify relationships between these relevant key words and phrases. If performed manually, a domain expert can filter through an accumulation of initial defined corpus of text and articles to create the causal domain model by using the initial defined corpus of text to assist in identifying intuitive categories of events and states relevant to the domain to define domain concepts and to further create a causal domain model by defining labels for domain concepts, attaching text descriptions to domain concepts, identifying key words and phrases for domain concepts, and building causal relationship between domain concepts.

Figure 2A:
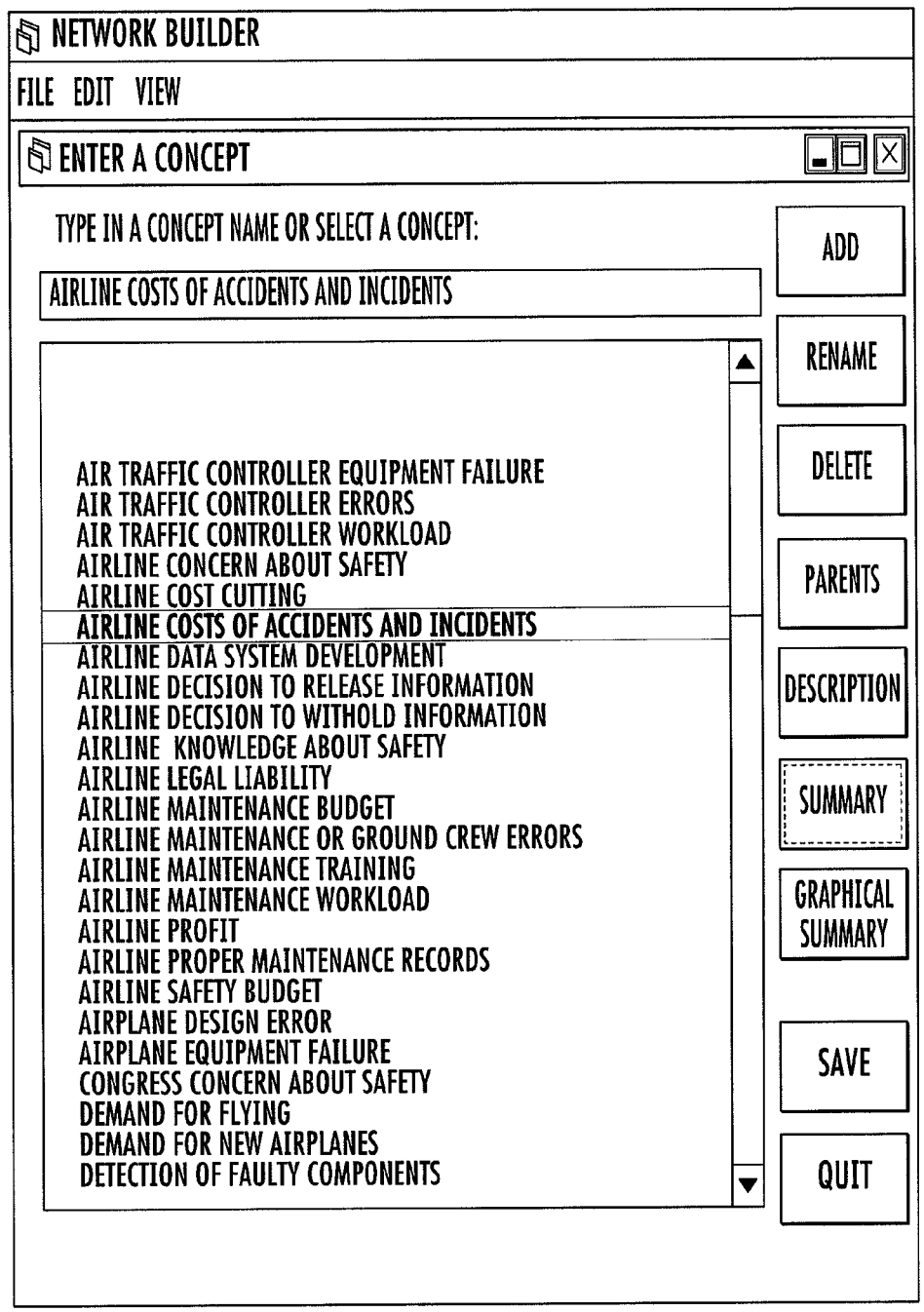
FIG. 2A is a pictorial representation of a graphical user interface for defining domain concepts for creating a causal domain model.
Figure 2B:
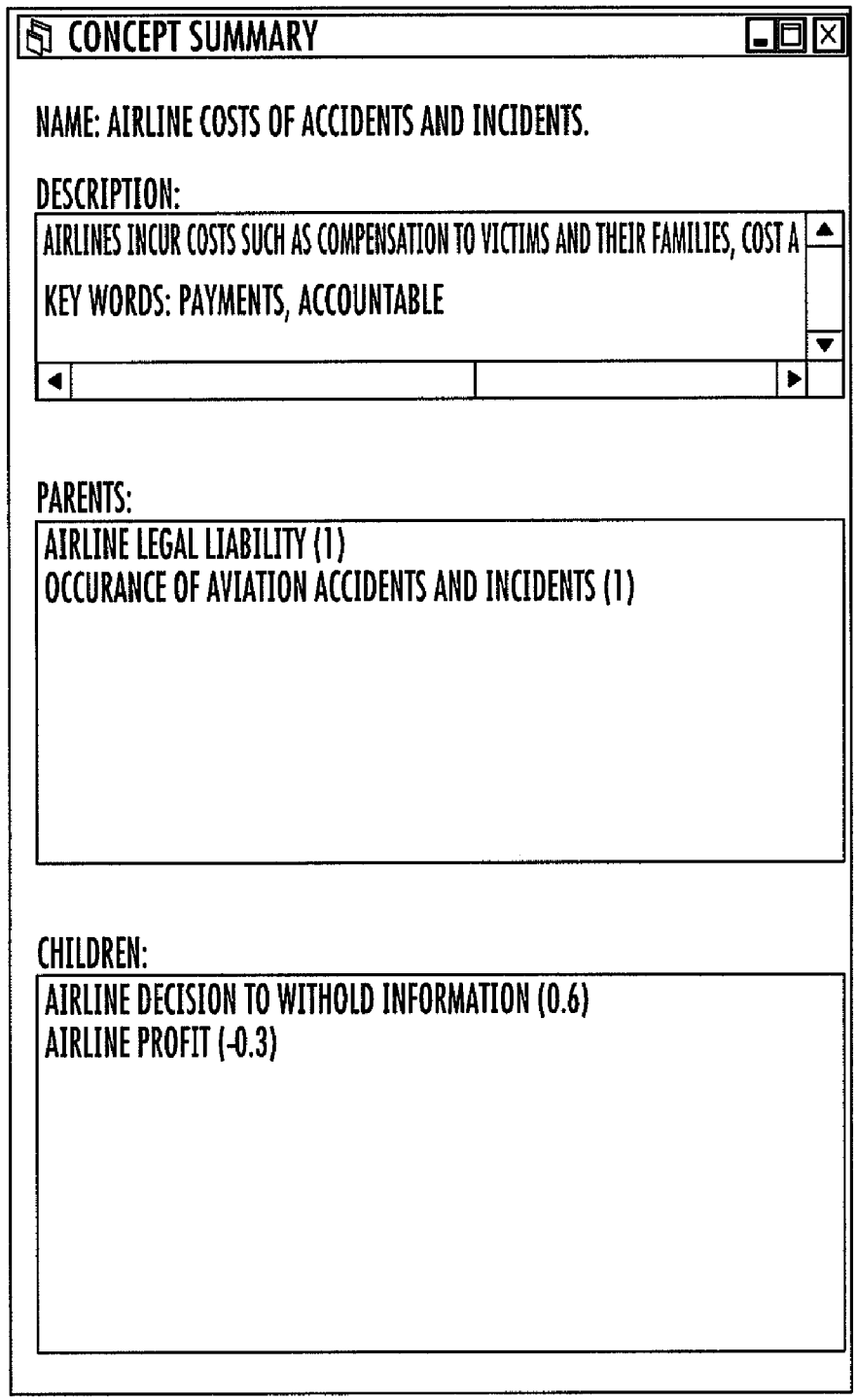
FIG. 2B is a pictorial representation of a graphical user interface for providing a text description and defining causal relationships between domain concepts for creating a causal domain model.

Defining domain concepts may include defining a label for the domain concept. Typically, a label is a textual name for the domain concept, such as "Airline Maintenance Budget" and other domain concepts as shown in FIG. 2A. A label may also identify a discrete event. A domain concept may also be defined by attaching a text description to the concept that provides a precise definition of the concept. The text description may be described as an abbreviated explanation of the domain concept, such as the truncated description of the domain concept "Airline Costs of Accidents and Incidents" shown in FIG. 2B. A domain concept may also be defined by including keywords and key multi-word phrases that are associated with the domain concept. For example, the domain concept Airline Costs of Accidents and Incidents may be further defined by including the keywords "payments" and "accountable," as shown in FIG. 2B. Key words and phrases may be augmented either semi-automatically or automatically using retrieval from external sources, morphological and inflexional derivations of other key words and phrases, and text and/or reasoning processing of documents. Further details regarding text and reasoning processing are provided below with respect to FIGS. 3 and 4. The more key words and phrases that are entered or augmented for a domain concept, the better a casual domain model may be used to process and evaluate text. External sources from which key words and phrases may be retrieved include a thesaurus, statistical Bayesian event classification keyword sets from training documents, and associated and/or related documents. A statistical Bayesian event classification keyword set is later described with regard to text processing in FIG. 4. Associated and/or related documents may be attached to a domain concept to provide further description and additional key words and phrases. The label, text description, key words and phrases, and associated and/or related documents are generally referred to as the textual parameters of domain concepts.

In addition to textual parameters, domain concepts may be further defined by quantitative and/or numerical parameters. A domain concept may be a state transitional quantity that can change positively or negatively to represent a positive or negative change in frequency of occurrence of an event. For example, a domain concept may be further defined by dimensional units of state transitions. Additional quantitative and/or numerical parameters may be defined when building causal relationships between defined domain concepts. For example, when creating a causal domain model, parent and child dependencies or relationships between domain concepts typically are established. Causal relationships may be entered manually, semi-automatically, or automatically. For example, a domain expert may manually identify that one domain concept has a causal relationship with at least one other domain concept, such as how the domain concept Airline Costs of Accidents and Incidents is a parent concept to the concepts of "Airline Legal Liability" and "Occurrence of Aviation Accidents and Incidents" and a child concept to the concepts of "Airline Decision to Withhold Information" and "Airline Profit," as shown in FIG. 2B. When a domain concept is identified as a parent of another concept such that a parental setting is established, a child dependency may autopopulate for the child concept to identify the child concept as being a child of the parent concept. Alternatively, or in addition, both parent and child settings may be accepted by manual input, thus providing for bidirectional autopopulation either from the parent or child dependency. In addition to establishing causal relationships, an embodiment of the present invention may accept causal relationship weight variances from negative 1 to 0 to positive 1, and all values in between. The range of negative 1 to 0 to positive 1 reflects the change from an inverse causal relationship (−1) to no causal relationship (0) to a direct causal relationship (+1). For example, Airline Profit has a −0.3 causal relationship to Airline Costs of Accidents and Incidents. Thus, when Airline Costs of Accidents and Incidents increases by a factor of C, Airline Profits decrease by a factor of 0.3×C. The weight of causal relationships may be entered by the domain expert to represent the domain expert's subjective belief of the strength of the causal relationship between domain concepts.

Further quantitative or numerical parameters of domain concepts may be used to establish a particular change or event occurrence. Such parameters may further define a domain concept, weights of causal relationships, and/or a query for use of the causal domain model. For example, a domain expert or other user may add a numerical range representing the magnitude of the estimated or expected change for a domain concept in the defined units. As shown in the example of FIG. 2C, an order of magnitude for change of 1000 has been selected to permit the domain expert to specify on the sliding scale that an event of the domain concept Occurrence of Accidents and Incidents has a factor of approximately 290 of change with respect to relationships with other domain concepts, specifically child dependencies. A domain expert or user may define the estimated or expected time duration of relationships or the estimated time of a change or event. Typically these estimated or expected time durations represent the time lapse between a cause and effect.

The present invention is a consistent, simple, and expedient way to allow a domain expert to create a causal domain model. The present invention allows for adjustability in changing parameters of the model and updating relationships and further defining domain concepts and grammar of the domain model, i.e., the language of the domain. One advantage of the present invention is the simplistic approach of allowing a domain expert to define the causal domain model without needing to understand the reasoning methodology underlying the analytical tool that enables the performance of the analysis of information relevant to the domain. Using the present invention, a domain expert can offload bulk processing of text and articles and receive detection of alerts to events and trends. For example, once the casual domain model has been constructed, it may be implemented in a particular domain to analyze documents and/or identify information within the documents, if any, related to the casual domain model. The amount of text and number of documents that can be analyzed is limited merely by, for example, the rate at which documents and text therein can be acquired and the processing power of the processor such as a computer to perform text and reasoning algorithms upon the acquired text. The domain expert can later adjust textual, quantitative, and/or numerical parameters of the model.

By way of further explanation of the present invention, FIGS. 2A, 2B, 2C, and 2D are an embodiment of the respectively defined concepts as used in the domain of airline safety. For example, the domain concepts, or more appropriately the labels of the domain concepts, visible in FIG. 2A relate to various intuitive categories associated with airline safety, and the description and key words in FIG. 2B relate to a particular airline domain concept, Airline Costs of Accidents and Incidents.

FIG. 2A is a pictorial representation of an example embodiment of a graphical user interface for defining domain concepts. The graphical user interface allows a domain expert to define domain concepts by defining labels for each concept name, such as Airline Costs of Accidents and incidents as highlighted in FIG. 2A. The graphical user interface provides the domain expert the ability to quickly select a concept and then to further define information about the concept, such as attaching a description or providing additional summary information such as key words and phrases, attached documents, and causal relationships between parent and child concepts, such as using buttons as those shown in FIG. 2A.

FIG. 2B is a pictorial representation of an example embodiment of a graphical user interface for providing a text description for defining causal relationships between domain concepts. A user might use the graphical user interface of FIG. 2B by selecting the Description button in the graphical user interface of FIG. 2A. The graphical user interface in FIG. 2B allows a domain expert to provide further information about a concept. For example, the description of the domain concept Airline Costs of Accidents and Incidents can be entered along with key words and phrases. In addition, causal relationships may be established between domain concepts by defining a domain concept as a parent or child of another domain concept, as well as the weighting therebetween as shown in parentheses.

FIG. 2C is a pictorial representation of an example embodiment of a graphical user interface for defining dimensional units of domain concepts. The graphical user interface allows a domain expert to define units for a concept. For example, in FIG. 2C the units per time and the range for units may be entered, such as the number of incidents per quarter for the domain concept Occurrence of Accidents and Incidents. Similarly, the range for change may be established by a magnitude of change and a detailed sliding scale. In addition, the domain expert may be able to establish whether or not a domain concept is symmetric. Additional quantitative and/or numeric information may be added in this or other embodiments of the present invention.

Figure 2D:
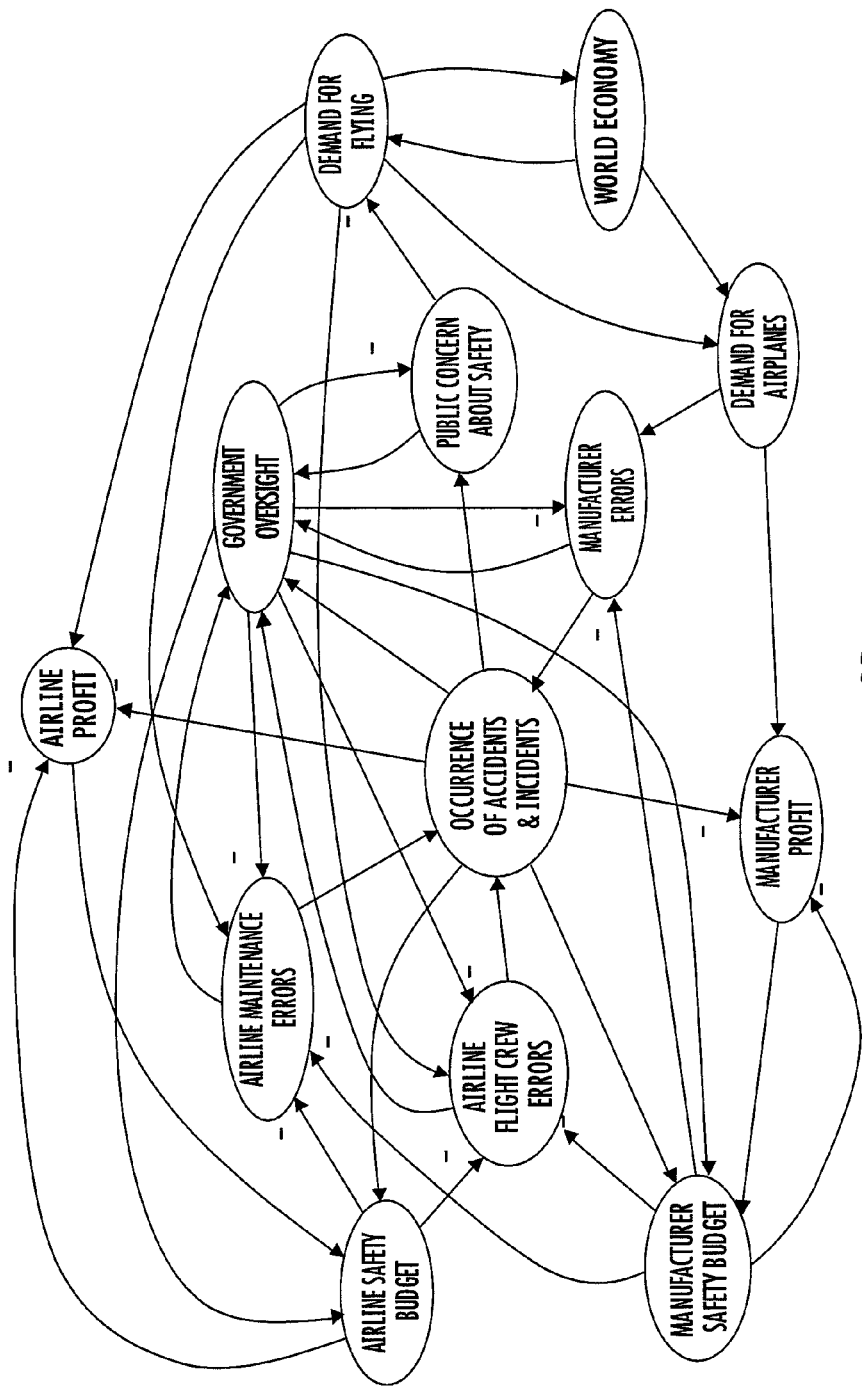
FIG. 2D is a pictorial representation of an unconstrained causal domain model.

FIG. 2D is a pictorial representation of a directed graph of an unconstrained causal domain model of the present invention, or at least a fragment thereof. The directed graph in FIG. 2D has cycles or connections that circle back from one node to the original node. Nodes are connected based on causal relationships, and the casual relationships may represent positive and negative casual dependences of the connection. For example, the "Manufacturer Safety Budget" concept node relates to the "Manufacturer Errors" concept node with an inverse causal relationship as noted by the (−) sign associated with the arc. The causal relationships and weightings between nodes of FIG. 2D are established from parent and child relationships of a domain mode, such as defined by a domain expert using the graphical user interfaces of FIGS. 2A, 2B, and 2C.

II. Mathematical Formalization of Causal Domain Model, Text Processing, and Reasoning Processing FIG. 3 is a diagram of reasoning processing. As previously discussed, certain aspects of the present invention are not independent of other various aspects of the invention, such as how the embodiment of reasoning processing shown in FIG. 3 incorporates or draws upon the concept of performing text processing and having previously defined a causal domain model. Similarly, the reasoning processing in FIG. 3 uses the unconstrained causal domain model created by a domain expert as described above. Thus, the various aspects of the present invention are intertwined and related, such as shown in FIG. 1.

A. Mathematical Formalization of Causal Domain Model

Figure 3A:
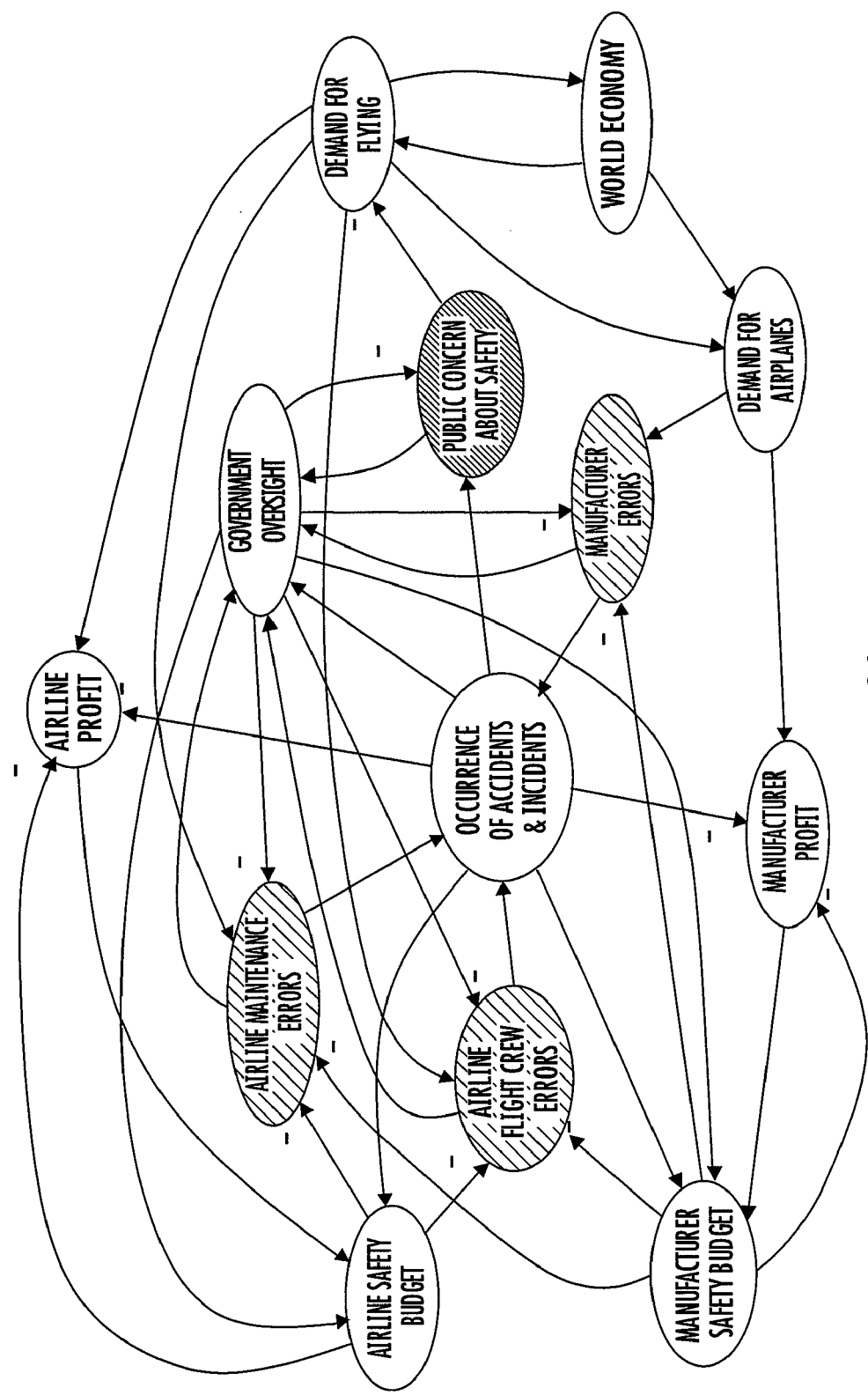
FIG. 3A is a pictorial representation of a focused unconstrained causal domain model.

The creation of a causal domain model by a domain expert results in an unconstrained causal domain model, which is a directed graph with cycles as shown in the example of FIG. 3A. In a directed graph with cycles of the unconstrained causal domain model, nodes of the graph represent domain concepts. The nodes are connected by influence arcs which may be causal or probabilistic in nature. And arcs of the graph represent weights of believed causal relationships between the nodes.

Prior to performing reasoning algorithms, the unconstrained causal domain model is converted from an unconstrained causal domain model into a formalization by performing mathematical formalization on the unconstrained causal domain model. The mathematical formalization may be performed manually, semi-automatically, or automatically. By transforming the unconstrained causal domain model into a mathematical formalization, the formalized model can support processing of the domain using mathematical reasoning algorithms. When converting the unconstrained causal model to a formalization, minimizing information loss may aid in retaining the causal domain model as intended by the domain expert. Based on information input by a domain expert or user creating an unconstrained causal domain model, different causal domain models can be constructed to formalize the domain concepts and causal relationships between domain concepts. For example, a formalized domain model may be constructed utilizing model-based reasoning, case-based reasoning, Bayesian networks, neural networks, fuzzy logic, expert systems, and like inference algorithms. An inference algorithm generally refers to an algorithm or engine of one or more algorithms capable of using data and/or information and converting the data and/or information into some form of useful knowledge. Different inference algorithms perform the conversion of data and/or information differently, such as how a rule-based inference algorithm may use the propagation of mathematical logic to derive an output and how a probabilistic inference algorithm may look for linear correlations in the data and/or information for a predictive output. Many inference algorithms incorporate elements of predictive analysis, which refers to the prediction of a solution, outcome, or event involving some degree of uncertainty in the inference; predictive analysis typically refers to a prediction of what is going to happen but, alternatively or in addition, may refer to a prediction of when something might happen. Different types of inference algorithms, as mentioned above, may be used with embodiments of the present invention. Since Bayesian networks can accept reliability data as well as information from other sources, such as external information from a knowledge base, and can compute posterior probabilities for prioritizing domain concepts, a formalized causal domain model of one advantageous embodiment is constructed based upon a Bayesian network that is capable of being updated. See, for example, S. L. Lauritzen et al., Local Computations with Probabilities on Graphical Structures and Their Applications to Expert Systems, Journal of the Royal Statistical Society B, Vol. 50, pp. 157-224 (1988), for a more detailed discussion of the Bayesian probability update algorithm. A number of software packages are commercially available for building models of a Bayesian network. These commercially available software packages include DXpress from Knowledge Industries, Inc., Netica™ from Norsys Software Corporation of Vancouver, British Columbia, and HUGIN from Hugin Expert A/S of Denmark. As provided by these commercially available software packages, a processing portion of a computer system may advantageously include a software package that includes noisy max equations for building the Bayesian network that will form the formalized causal domain model.

Regardless of the model building tool that is used, the general approach to constructing a Bayesian network for decision support is to map parent domain concepts to the child domain concepts. While any model building approach can be used, several model building approaches for Bayesian networks are described by M. Henrion, *Practical Issues in Constructing a Bayes' Belief Network*, Uncertainty in Artificial Intelligence, Vol. 3, pp. 132-139 (1988), and H. Wang et al., *User Interface Tools for Navigation in Conditional Probability Tables and Graphical Elicitation of Probabilities in Bayesian Networks*, Proceedings of the Sixteenth Annual Conference on Uncertainty and Artificial Intelligence (2000).

The construction of a Bayesian network requires the creation of nodes with collectively exhaustive, mutually exclusive discrete states, and influence arcs connecting the nodes in instances in which a relationship exists between the nodes, such as in instances in which the state of a first node, i.e., the parent node, effects the state of a second node, i.e., the child node. In a Bayesian network, a probability is associated with each state of a child node, that is, a node that is dependent upon another node. In this regard, the probability of each state of a child node is conditioned upon the respective probability associated with each state of each parent node that relates to the child node.

An example formalized domain model is a directed acyclic graph (DAG) Bayesian network capable of predicting future causal implications of current events that can then use a Bayesian reasoning algorithm, or Bayesian network belief update algorithm, to make inferences from and reason about the content of the causal model to evaluate text. By using a Bayesian network directed acyclic graph, the transformation from an unconstrained causal model minimizes the information loss by eliminating cycles in the unconstrained graph by computing information gained and eliminating the set of arcs that minimize the information lost to remove the cycles and create the direct acyclic graph. Another example of a formalized domain model is a set of fuzzy rules that use fuzzy inference algorithms to reason about the parameters of the domain.

The nodes of a Bayesian network include either, or both, probabilistic or deterministic nodes representative of the state transition and discrete event domain concepts. Typically, the nodes representative of domain concepts are interconnected, either directly or through at least one intermediate node via influence arcs. The arcs interconnecting nodes represent the causal relationships between domain concepts. For example, FIGS. 3C and 3D show representative concept nodes related to the public concern about airline safety where nodes are interconnected, directly and through at least one intermediate node via influence arcs. Based on interconnections of concept nodes, intermediate nodes may interconnect at least two domain concept nodes in an acyclic manner. Bayesian networks do not function if a feedback loop or cycle exists. Therefore, influence arcs are not bidirectional, but only flow in one direction.

Each node of a network has a list of collectively exhaustive, mutually exclusive states. If the states are normally continuous, they must be discretized before being implemented in the network. For example, a concept node may have at least two states, e.g., true and false. Other nodes, however, can include states that are defined by some quantitative and/or numerical information. For example, Airline Profit may contain six mutually exclusive and exhaustive states, namely, strong profits, moderate profits, weak profits, no profit, losing profits, and bankrupt. Alternatively, Airline Profit may contain a defined range of states, such as from positive one hundred million to negative one hundred million. A probability, typically defined by a domain expert, may be assigned to each state of each node. A probability may be obtained from or related to another node or nodes. For example, as shown in FIGS. 3C and 3D, the probability of Occurrence of Accidents and Incidents may be exclusively based on or derived in part from such domain concepts as Airline Flight Crew Errors, Manufacturer Errors, and Airline Maintenance Errors, where the interconnecting arcs therebetween and influence of probabilities are based upon their respective causal relationships and weightings.

Figure 3B:
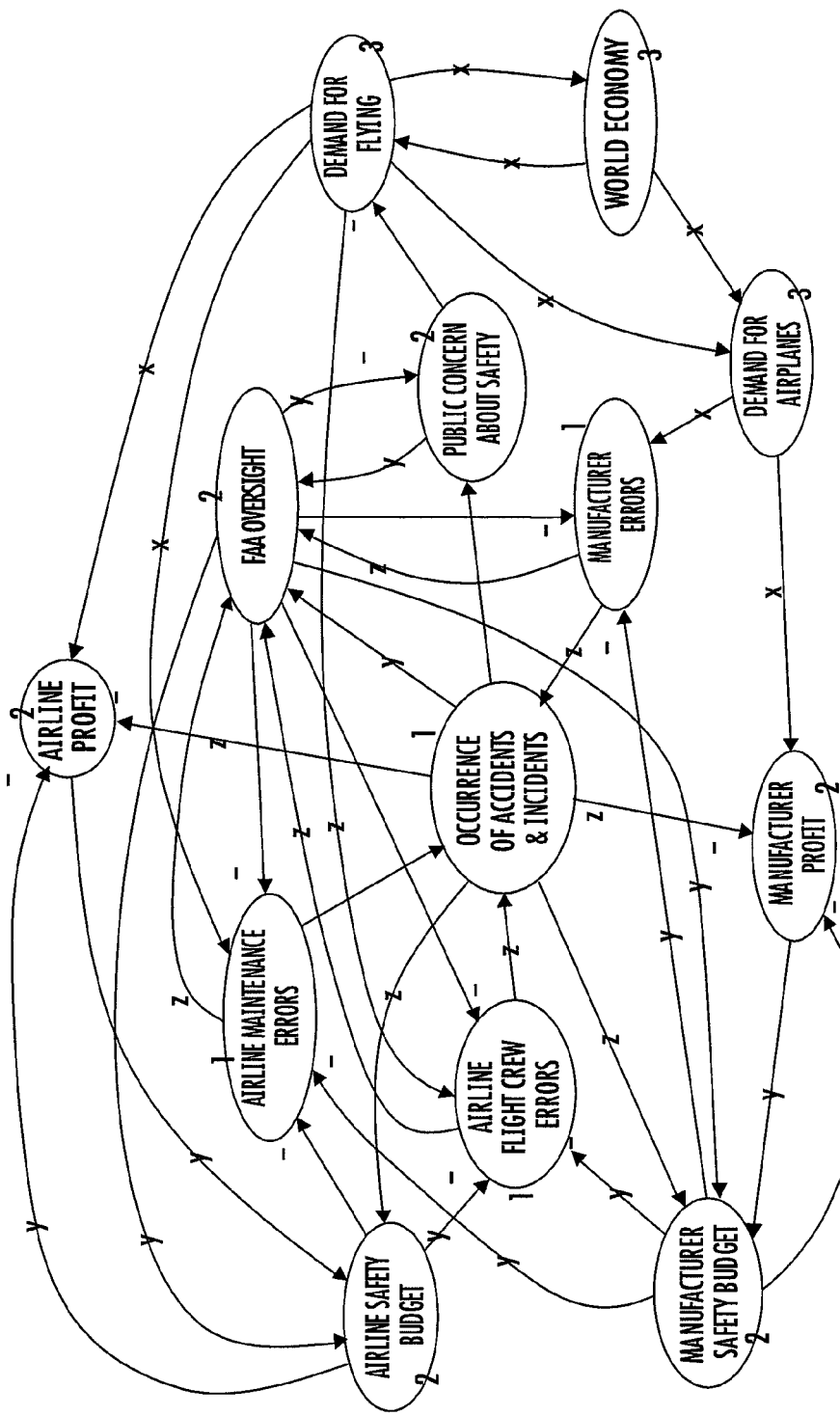
FIG. 3B is a pictorial representation of a processed, focused, unconstrained causal domain model.
Figure 3C:
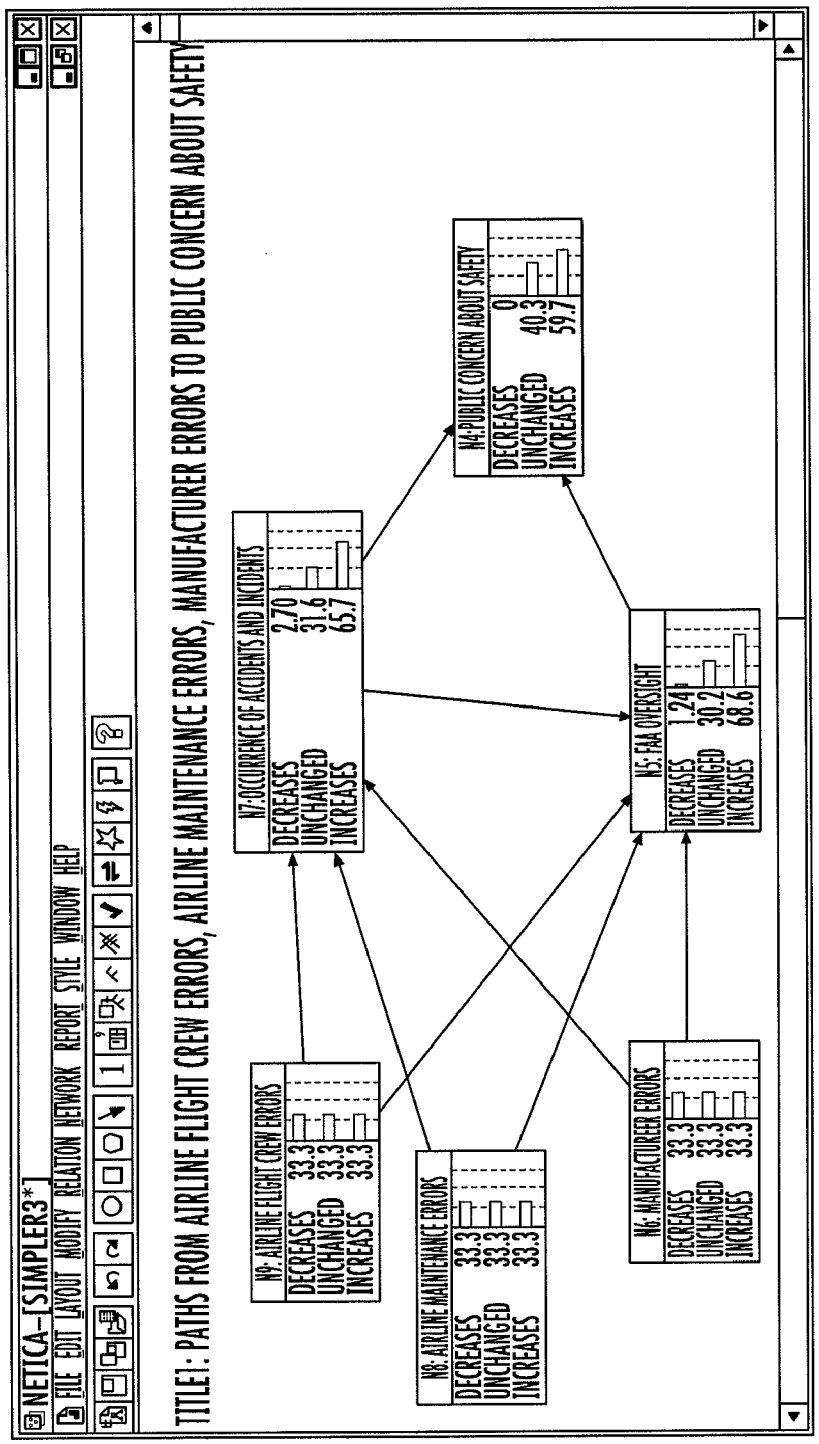
FIG. 3C is a pictorial representation of a graphical user interface for representing a formalization of a processed, focused, unconstrained causal domain model.
Figure 3D:
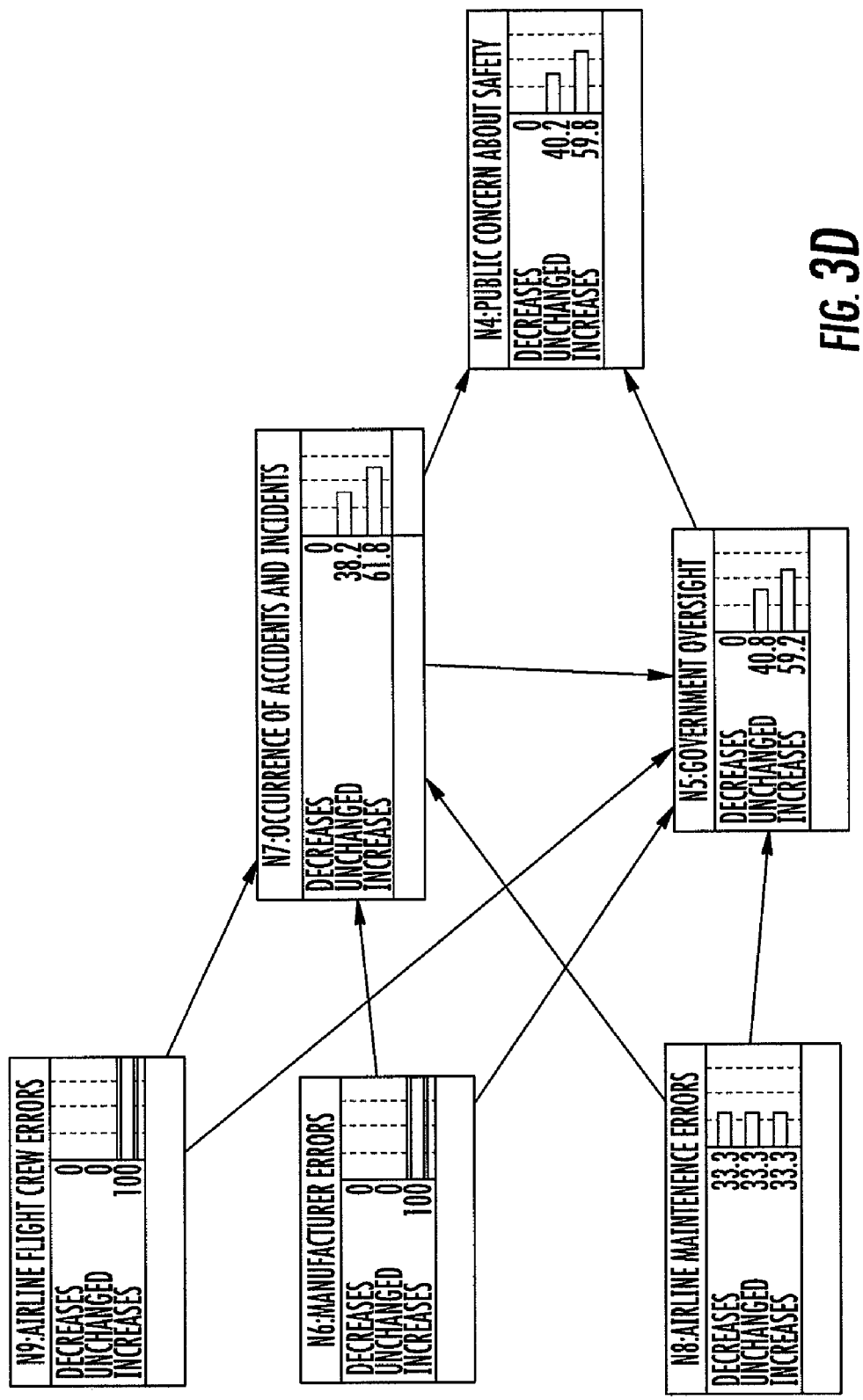
FIG. 3D is a pictorial representation of a graphical user interface for representing a formalization of another processed, focused, unconstrained causal domain model.

FIGS. 3A, 3B, 3C, and 3C provide examples of a formalization of an unconstrained causal domain model as described above. FIG. 3A is a pictorial representation of a focused unconstrained causal domain model which is a result of an embodiment of the present invention where a domain expert has predicted the probability, magnitude, and time of a target domain concept change due to changes in other source concepts. For example, the domain expert has selected Airline Maintenance Errors as a source concept and Occurrence of Accidents and Incidents as a target concept. Further source concepts for the target concept Occurrence of Accidents and Incidents also include Airline Flight Crew Errors and Manufacturer Errors. Source and target concepts are not the same as parent and child concepts, but are beginning and ending concepts for a query of set of implications of interest. However, underlying source and target concepts are at least one parent and child concept pairing and at least one causal relationship between the parent and child concepts. The source and target concepts and related predictions of probability, magnitude, and time of the target concept change due to changes in other source concepts focus the causal domain model with respect to the Public Concern about Safety Domain concept. For example, the relationship between the domain concepts Government Oversight and Airline Maintenance Errors may strengthen over time if the government determines that Airline Maintenance Errors are an increasing cause of airline accidents or incidents. In such a case, the causal relationship may shift from zero, representing no influence, to +0.75, representing a subjective believed strength of direct influence between the domain concepts. These causal relationships may be further defined as shown in FIG. 3B, which is a pictorial representation of a graphical user interface for representing a formalization of a processed focused unconstrained causal domain model of the present invention. FIG. 3A shows where the domain expert or user may have identified particular domain concepts of importance, i.e., Airline Maintenance Errors, Airline Flight Crew Errors, and Manufacturer Errors, and a target domain concept, i.e., Public Concern About Safety, that relates to a particular query, e.g., the probability of change of public concern about safety in the current state of the airline industry domain. FIG. 3B represents an intermediate transformation of the focused unconstrained causal domain model of FIG. 3A. FIG. 3B shows how mathematical formalization may compute values for information obtained by causal relationships and importance of particular domain concepts, such as how influence arcs have been valued or categorized as x, y, or z and domain concepts valued by 1, 2, or 3. Levels of categorization is an example of one method for formalizing domain models. For example, during mathematical formalization, values of relative importance of the concepts may be calculated, such as 1 being most important and 3 being less important as shown in FIG. 3B. Similarly, during mathematical formalization, values or categorization of importance of the relationship arcs between concepts may be calculated, such as z being necessary, y being optional, and x being unnecessary as shown in FIG. 3B. Formalization typically takes into account the computation of information gained and minimization of information loss where arcs can be removed from the cyclical graph as represented in FIGS. 3C and 3D. FIGS. 3C and 3D involve the same concepts and directed relationships, however the numerical parameters of the domain concepts and weight of relationships are different between the two, representing different causal domain models, or at least different versions of a causal domain model. However, different causal domain models, such the causal domain models expressed in FIGS. 3C and 3D, may result in similar outcomes, as described further below. FIG. 3C is a pictorial representation of a graphical user interface for representing a formalization of a processed focused unconstrained causal domain model. FIG. 3D is a pictorial representation of a graphical user interface for representing a formalization of a processed focused unconstrained causal domain model and resulting graph of initial domain model state. In both FIG. 3C and FIG. 3D, the directed relationships from the Public Concern About Safety to the source concepts of Airline Flight Crew Errors, Airline Maintenance Errors, and Manufacturers Errors and intermediate source concepts Occurrence of Accidents and Incidents and Government Oversights have been removed such that the causal relationships remaining after the transformation from an unconstrained causal domain model to a mathematical formalization result in acyclic graphs that flow from source concepts to target concepts and intermediate source concepts to the final target concept, Public Concern About Safety. The directed causal relationships or influence arcs between target and source concepts of FIGS. 3C and 3D may influence probabilistic or deterministic values of source concepts. For example, FIGS. 3C and 3D, involving the same concepts and directed relationships but with different numerical parameters of the domain concepts and weight of relationships, arrive at different probabilistic results for Public Concern About Safety. However, it may also be useful to note that the domain models of FIGS. 3C and 3D result in different intermediate domain concept probabilities but arrive at similar resultant target concept probabilities. This may not be intended, but reflects that, just as two domain experts may interpret a situation differently and, therefore, create different domain models, the present invention provides the versatility of accepting different models to evaluate the same or similar domains, and may, as in FIGS. 3C and 3D, arrive at similar results, just as two domain experts may have done without the assistance of the present invention. However, by using the present invention the domain experts may arrive at these results much faster and may be able to analyze much larger quantities of information, thereby decreasing the chance that important information may not be analyze or that results may be incomplete or incorrect due to limited information.

B. Text and Reasoning Processing

Once a formalized domain model is established, text and reasoning processing algorithms may operate based on the domain model, such as to process text and determine results. Text processing refers to performing text processes or text algorithms, such as embodied in a text processing tool or engine. Reasoning processing refers to performing reasoning processes or reasoning algorithms, such as embodied in a reasoning processing tool or engine typically including one or more inference algorithms. Text processing tools typically also involve inference algorithms for extraction of text data and identifying inferences from text. FIG. 3 defines other details related to performing reasoning processing. For example, aspects of performing reasoning processing include identifying trends and defining an initial model state for further prediction, validating the model, updating the model due to domain changes, and enhancing the model by discovering new dependencies, weights, etc.

The performance of reasoning processing shown in FIG. 3 may be, for example, execution of the Bayesian network belief update algorithm or similar reasoning algorithm such as other inference algorithms. The performance of reasoning processing applies the formalized causal domain model to specifically acquired text profiles, described further with respect to FIG. 4. The performance of deterministic and resultant reasoning processing requires that, either prior to or for the purpose of performing the deterministic or resultant reasoning processing, a domain expert or other user establish a query, as shown in block 22 of FIG. 1 and in FIG. 2. By establishing a query the domain expert or user establishes a change or event occurrence query and/or a set of implications of interest. A causal domain model that has been transformed into a mathematical formalization and processed with reasoning and text algorithms in accordance with an established query for the causal domain model can provide an output for knowledge driven decision support. For example, an embodiment of the present invention may provide an output that extracts an inference about causal implications of the current state of the domain as supported by text documents and the text profiles of the documents. Further, a query, such as identifying the probability of public concern about airline safety based upon the current state of the domain, supported by related documents, could generate an output that identifies that the probability of public concern about airline safety increasing is 59.8% and remaining unchanged is 40.2%, as shown in FIG. 3D. An output can predict critical events or model time dependent events. In addition, an embodiment of the present invention can summarize information about a prediction or modeling of an event or the extraction of an inference. The output of an embodiment of the present invention can then be used by a domain expert or a decision maker to assist in the decision making process.

FIG. 4 is a diagram of text processing. By transforming an unconstrained causal domain model into a mathematical formalization, a text profile resulting from initial text processing is not only able to associate text content to the model such as by matching text content to the formalized model or identifying key words and phrases for domain concepts, but is also able to compute implications of interest, e.g., detecting trends, buried in the text using inference algorithms. Text processing of the present invention includes the concept that the formalized causal domain model trains the text processing or text analyzer to extract information from text. The information in the formalized causal domain model is used by the resulting text processing or text analyzer. Thus, an embodiment of the present invention may be described as text profiling using a cognitive model. Before text processing can begin, information and data is acquired upon which text processing can be performed. One advantageous feature of the present invention is the ability to evaluate large amounts of data. Text source documents may be harvested or data mined from the Internet and other sources. A web crawler can be used to extract relevant documents and information about events described by the documents from the Internet. Various methods of data mining may be used to acquire information and data upon which text processing of the present invention is performed. The term data mining has several meanings along a spectrum from data extraction, such as identifying and extracting relevant instances of a word or sections of text in a document, to finding an answer from a set of documents based on a domain model, to learning inferences that might be used in an inference engine. Typically data mining as used in the context of extraction of text refers to data extraction, but may also involve finding an answer or learning or identifying an inference. Typical data mining tools may also use inference algorithms, such as Bayesian classification of text for identifying text for extraction. The document retrieval process may be unrestricted or may be focused from the domain model. For example, a data mining technique or a web crawler may be focused by the key words and phrases or other information embodied in the domain model. Once information and data have been acquired, such as various documents or articles from the Internet, the text is typically extracted from the documents and articles either by extracting the text or removing images, tags, etc. to acquire raw text to which a text processor or a text analyzer may apply text processing algorithms. For example, the raw text data may be extracted through data mining or data mining may identify inferences in the text and extract such text required from the document to establish the inference for use by a text processing or reasoning processing algorithm. Typically, however, data mining of documents refers to extraction of text data for further analysis by a reasoning processing tool.

Once the information and data has been acquired and the text extracted from the information and data, a text profile is created for each text extraction. A filter using a relevance classification can be applied to all of the text extractions that have been acquired or retrieved. Using a relevance classification filter, text that is unrelated to the domain model may be filtered or removed from the text upon which the processing will be performed.

After relevance classification filtering of the extracted text, event classification filtering is applied to the remaining text. Event classification filtering looks for events of the type in the model or related to events in the model. The embodiment depicted in FIG. 4 uses two types of event classification methods: word-based event recognition text processing and structure-based event recognition text processing. Word-based event recognition text processing utilizes key words, and possibly key multi-word phrases, found in documents to recognize events. The embodiment of FIG. 4 utilizes two types of word-based event classification text processing methods: statistical (Bayesian) event classification and rule-based event classification. These two types of word-based event classification text processing methods are used in tandem in the embodiment of FIG. 4. The statistical or Bayesian event classification takes advantage of an initial classification of training documents where several documents are used for classifying each type of event to be recognized. Classification of training documents is typically performed manually or semi-automatically. The statistical or Bayesian event classification may also use a classification generation program to automatically produce a statistical Bayesian classifier program which reproduces event assignments for training documents by specifying a set of key words and weights for each type of event in the model. The set of key words is also used to improve the Boolean rules classification as described further below. If a key word appears in a document, in statistical or Bayesian event classification, a key word weight is added to the accumulated weight of the document for an associated event type. If the total accumulated weight of the document exceeds a threshold, the associated event type may be assigned to the document.

Rule-based event classification uses Boolean classification rules constructed from model event descriptions. Rule-based event classification also may use augmented vocabulary supplemented from a thesaurus of related terms and synonyms and may also use the Bayesian keyword set generated for statistical event classification.

Structure-based event recognition text processing uses complex natural language processing to recognize events. For example, structure-based event recognition text processing uses word order to detect whether a word is relevant to event recognition. This event recognition method is based on accurate parsing of text by a sophisticated parser and grammar. Using an accurate sentence parser, essential words and relations, or tuples, are extracted and used for event classification. Sentence parsing may be accomplished by using words that modify one another compiled by successive iterations of a large corpus of text, also referred to as a table of head collections.

As shown in FIG. 4, a common sense knowledge base, may supplement the creation of text profiles for documents and various aspects of text processing in general. For example, a knowledge base may be used for a vocabulary and/or grammar for analyzing documents. Further, a knowledge base related to a particular domain may be used with a causal domain model of the same or a related domain. From raw information and text, knowledge may be extracted or captured. Knowledge extraction generally is automated or semi-automated, identifying fragments of knowledge and text. For example, a general knowledge layer approach may be used to extract knowledge from the text by extracting abstract sentence patterns from raw text, and the abstract sentence patterns can be converted into formal logic representations for processing. Manual knowledge capture can be performed for example using a controlled language knowledge acquisition system that allows a user or domain expert to enter knowledge using a constrained subset of the English language. The entered knowledge can then be converted into a formal logic representation for processing to supplement the reasoning and text processing.

III. Embodiments of Systems of the Present Invention

A further combination of a causal domain model and text processing is to have the model serve as a filter to inspect text. This process is similar to the previously described updating of a causal domain model except that by allowing the causal domain model to serve as a filter to inspect text, the model and text processing may be set to run continuously or at periods of time, also referred to as the model being set on autopilot, to allow the model to filter the corpus of text as the corpus of text changes over time. An autopilot filter method allows the model to identify instances for possible changes to the model itself. In this manner the model may automatically or semi-automatically update textual parameters of domain concepts and quantitative and numerical parameters of domain concepts. For example this process may be used semi-automatically to identify supplemental key words and phrases that may be presented to a domain expert to accept or decline as additional key words and phrases for domain concepts of the causal domain model. Similarly, quantitative and/or numerical parameters of the domain and of domain concepts may be automatically or semi-automatically updated, such as increasing or decreasing weights of causal relationships as identified by text and/or reasoning processing of a changing corpus of text in accordance with the domain model. In this manner, a casual domain model may be perceived to learn and adapt from the changes in a domain similar to the manner in which a domain expert may learn additional information about the domain as the corpus of text and articles changes over a period of time and thereby adapt his or her analytical understanding of relationships and reasoning applicable to the domain.

Figure 5:
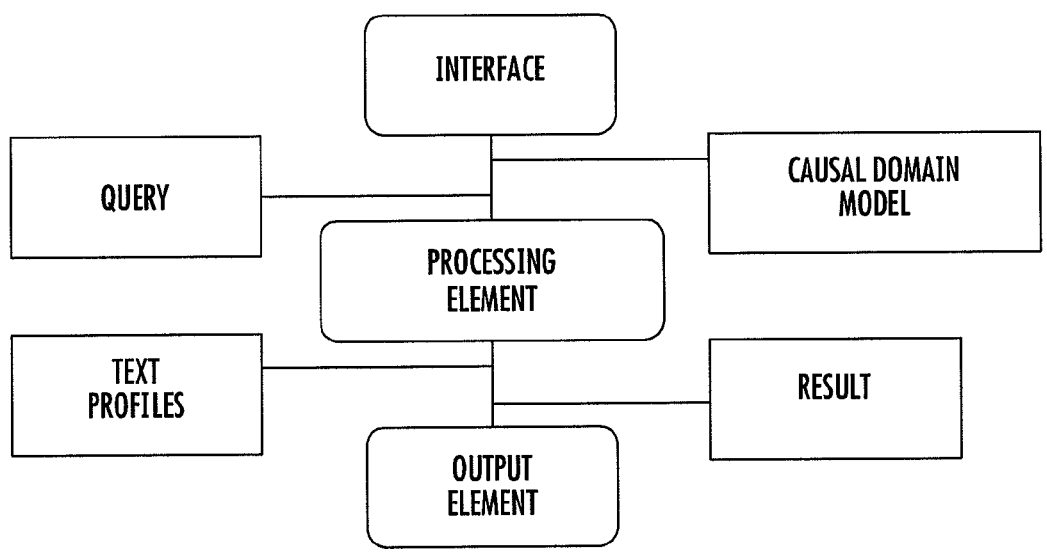
FIG. 5 is a diagram of a knowledge driven decision support system.

FIG. 5 is a diagram of a knowledge driven decision support system of the present invention that may be used for analyzing large amounts of textual data. An example embodiment of a knowledge driven decision support system may include an interface for receiving input relating to the creation of a causal domain model. The interface may be a graphical user interface or other type of interface that allows for receiving input by a domain expert or user. For example, an interface may allow for a user to input information via the Internet. In addition, an interface may allow input relating to the definition of a query.

Figure 6:
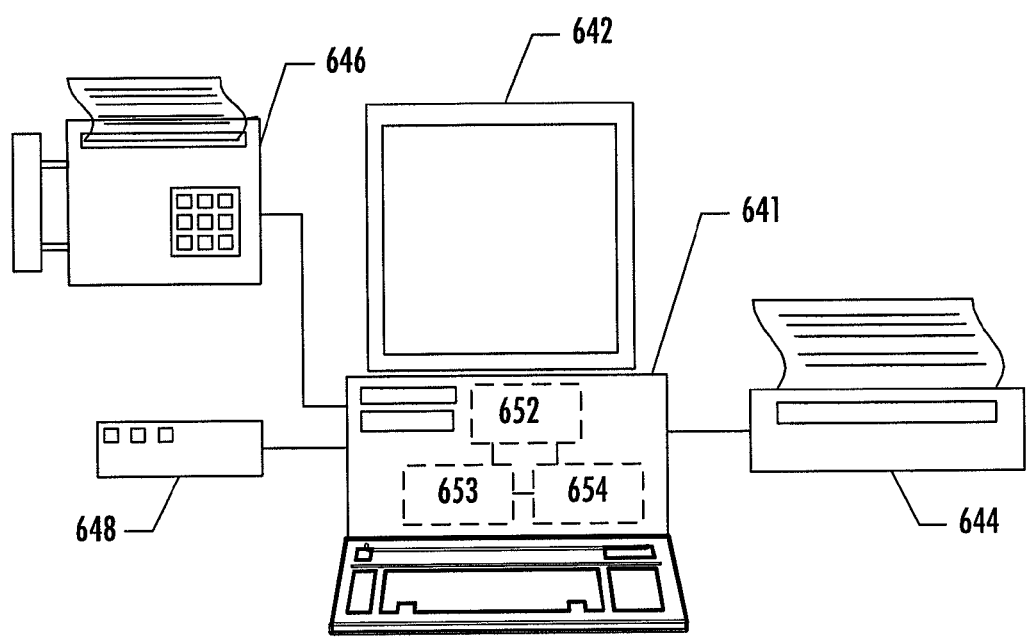
FIG. 6 is a schematic block diagram of a knowledge driven decision support system.

An embodiment of a knowledge driven decision support system of the present invention may also include a processing portion of a computer system, such as a processor 652, memory 653, and storage 654 of a computer system 641, as shown in FIG. 6, for transforming a causal domain model into a mathematical formalization of the domain model, acquiring documents and processing text of the documents in accordance with the domain model to create text profiles, and performing reasoning analysis upon the text profiles in accordance with the domain model using the mathematical formalization of the domain model to derive a result. Examples of textual processing are described with reference to FIG. 4. Examples of reasoning analysis are described with reference to FIG. 3. A processing portion of a computer system typically operates under software control, where the software is stored in memory 653 or storage 654, where all or portions of a corpus of documents is typically also stored.

A computer system can also include a display 642 for presenting information relative to performing embodiments of the present invention. The computer system 641 can further include a printer 644. Also, the computer system 641 can include a means for locally or remotely transferring the information relative to performing embodiments of the method of the present invention. For example, the computer can include a facsimile machine 646 for transmitting information to other facsimile machines, computers, or the like. Additionally, or alternatively, the computer can include a modem 648 to transfer information to other computers or the like. Further, the computer can include an interface to a network, such as a local area network (LAN), and/or a wide area network (WAN). For example, the computer can include an Ethernet Personal Computer Memory Card International Association (PCM-CIA) card configured to transmit and receive information, wirelessly and via wireline, to and from a LAN, WAN, or the like.

Typically, computer program instructions may be loaded onto the computer 641 or other programmable apparatus to produce a machine, such that the instructions which execute on the computer or other programmable apparatus create means for implementing functions specified with respect to embodiments of the present invention. These computer program instructions may also be stored in a computer-readable memory, such as system memory 653, that can direct a computer or other programmable apparatus to function in a particular manner, such that the instructions stored in the computer-readable memory produce an article of manufacture including instruction means which implement functions specified with respect to embodiments of the present invention. The computer program instructions may also be loaded onto the computer or other programmable apparatus to cause a series of operational steps to be performed on the computer 641 or other programmable apparatus to produce a computer implemented process such that the instructions which execute on the computer 641 or other programmable apparatus provide steps for implementing functions specified with respect to embodiments of the present invention.

As a result of the causal domain model derived from the interface and the processing portion of a computer system transforming the causal domain model and performing textual and reasoning processing upon text profiles, a knowledge driven decision support system of the present invention is capable of providing a result. The result may be provided by an output element, such as a display or monitor. However, an output element may also be embodied by such devices as printers, fax output, and other manners of output such as including email that may advantageously be used to update a user or domain expert at a subsequent time after a query has been established for a domain model. A result may be as simple as a text message, such as a text message indicating excessive occurrences of airline accidents and incidents in the particular time frame. However, results may be substantially more complex and involve various text and reasoning processing algorithms to provide knowledge driven decision support, such as performing hypothesis generation based upon a causal domain model and a query or set of implications of interest. Embodiments of the present invention may be used in varying domains for various applications to derive various results.

By employing embodiments of the present invention, a domain expert or user is provided the analytic capability to present queries to a domain model about the effect that perceived changes in domain concepts, detected from a collection of articles associated with the domain, may have on other concepts of interest. In other words, embodiments of the present invention provide the ability to quantify the likelihood and extent of change that may be expected to occur in certain quantities of interest as a result of changes perceived in other quantities. A corresponding computer program product or software tool may embody the previously described functions and aspects of the present invention. For example, a computer-useable medium can include control logic for performing a text processing algorithm or a reasoning processing algorithm, whereby such control logic is referred to as a text processing tool and a reasoning tool. Similarly, a computer-useable medium can include control logic for receiving input and providing output, referred to as an input tool and an output tool. A tool may include software, hardware, or a combination of software and hardware to perform the described functions and aspects of embodiments of the present invention. A tool may comprise a separate processor or function with a primary processing portion of a computer system.

Embodiments of the present invention may also provide a domain expert or user the ability to investigate results, trends, etc. by back propagating the text and reasoning processing to identify documents that influence the outcome of the processing applying a domain model. For instance, an embodiment of the present invention may allow a user to review relevant documents where relevant words and model concepts may be highlighted in the text. A user may be able to review the text profiles for relevant documents. Similarly, an embodiment of the present invention may display document set results organized by model concept to provide a domain expert the ability to review documents related to the domain and the application of the domain model.

An example embodiment of creating a causal domain model of the present invention may begin when a domain expert identifies domain concepts and provides labels for these domain concepts. The domain expert may provide a text description for each domain concept, and further add keywords, additional description, supplemental documents of importance for the domain concept. The domain expert may also establish quantitative or numerical parameters by which to evaluate a particular domain concept, such as identifying that airline profit is measured in hundreds of thousands of dollars or manufacturer safety budget is measured by a percentage of total manufacturer budget. The domain expert can build relationships between domain concepts and establish believed weights for the causal relationships that indicate strengths of indirect or direct influence between the domain concepts.

An example embodiment for using a causal domain model occurs when a domain expert establishes a query, such as the probability of change of public concern about airline safety, or establishes as a threshold for indicating a possible event or need for change, such as government oversight, demand for flying, or manufacturer profit falling too low below an established threshold. From all of the information available about the domain model and related query, a mathematical formalization may be applied to the domain model to derive a formalized model. Based on the formalized domain model, text and reasoning processing may be applied to a corpus of text that may have been harvested from the Internet by a web crawler. Using the text processing, reasoning processing, formalized domain model, and query, an embodiment of the present invention can provide knowledge driven decision support information, such as information provided in the form of a query result or trend alert.

The inventions are not to be limited to the specifically disclosed embodiments, and modifications and other embodiments are intended to be included within the scope of the appended claims. Although specific terms are employed herein, they are used in a generic and descriptive sense only and not for purposes of limitation.

That which is claimed:

1. A system for assisting knowledge driven decision support, comprising:
    a processor configured to operate a directed acyclic graph Bayesian network of an unconstrained causal domain model, a text processing tool, and a reasoning tool;
    the unconstrained causal domain model configured to define and store, on a computer-readable medium, at least two domain concepts and at least one causal relationship between the domain concepts, wherein the directed acyclic graph Bayesian network is configured to represent a formalization of the unconstrained causal domain model with minimal information loss by eliminating cycles of the unconstrained causal domain model by computing information gain and eliminating influence arcs of the unconstrained causal domain model that minimizes information loss;
    the text processing tool configured to analyze at least one document using the directed acyclic graph Bayesian network to produce at least one text profile for the at least one document; and
    the reasoning tool configured to determine a result by analyzing the at least one text profile using at least one domain concept of the directed acyclic graph Bayesian network and one causal relationship of the domain concept, wherein the reasoning tool is further configured to use the text processing tool to use the directed acyclic graph Bayesian network, and wherein the reasoning tool is further configured to electronically present a display identifying the result of the analysis of the reasoning tool, providing a user the ability to use the result in a decision making process.

2. The system of claim 1, wherein the text processing tool comprises:
    a text acquisition tool configured to acquire and store, on a computer-readable medium, text from at least one document.

3. The system of claim 2, wherein the text acquisition tool comprises:
    a data mining tool configured to mine at least one document;
    a document retrieval tool configured to receive at least one mined document; and
    a text extraction tool configured to extract text from at least one retrieved document to provide text.

4. The system of claim 2, wherein the text acquisition tool further comprises:
    a text profiling tool configured to profile the acquired text, wherein the text profiling tool is further configured to use at least one domain concept of the unconstrained causal domain model to create and store, on a computer-readable medium, text profiles of the text.

5. The system of claim 1, wherein the reasoning tool comprises:
    a transformation routine configured to transform the unconstrained causal domain model into a mathematical formalization of the unconstrained causal domain model.

6. The system of claim 1, wherein the reasoning tool comprises a Bayesian network belief update algorithm.

7. The system of claim 1, further comprising:
    a common sense knowledge base configured to be used by at least one of the text processing tool and the reasoning tool.

8. The system of claim 1, further comprising:
    an interface configured to receive input for creating the unconstrained causal domain model.

9. The system of claim 1, further comprising:
    an interface configured to receive input for creating the unconstrained causal domain model;
    wherein the processor is further configured to transform the unconstrained causal domain model into a mathematical formalization of the unconstrained causal domain model, communicate with the text processing tool for analyzing text of documents in accordance with the unconstrained causal domain model to create text profiles, and communicate with the reasoning tool for performing reasoning analysis upon the text profiles in accordance with the unconstrained causal domain model using the direct acyclic graph Bayesian network to derive a result; and
    an output element configured to present the result.

10. The system of claim 9, wherein the unconstrained causal domain model comprises a plurality of domain concept nodes associated with domain concepts and interconnected by relationship arcs associated with causal relationships between the domain concepts in a manner defined by at least one of the input relating to the creation of the unconstrained causal domain model, the processing of text, and the performance of reasoning analysis.

11. A method, comprising:
    providing an unconstrained causal domain model defined by domain concepts and causal relationships between the domain concepts;
    transforming, using a processor, the unconstrained causal domain model into a directed acyclic graph Bayesian network formalism with minimal information loss, wherein the transformation comprises eliminating cycles of the unconstrained causal domain model by computing information gain and eliminating influence arcs of the unconstrained causal domain model that minimizes information loss;
    storing on a computer-readable medium, the directed acyclic graph Bayesian network formalism;
    analyzing text using the direct acyclic graph Bayesian network formalism to extract information and derive test profiles;
    storing, on a computer-readable medium, the text profiles;
    performing reasoning analysis of the text profiles according to the directed acyclic graph Bayesian network formalism to derive a result; and
    electronically presenting a display identifying the result of the reasoning analysis, providing a user the ability to use the result in a decision making process.

12. The method of claim 11, further comprising:
    creating the unconstrained causal domain model by defining the domain concepts and the causal relationships, wherein at least one of the domain concepts and the causal relationships are configured to be used to derive text profiles, formalize the unconstrained causal domain model as the directed acyclic graph Bayesian network, and perform reasoning analysis; and
    storing, on a computer-readable medium, the unconstrained causal domain model.

13. The method of claim 11, wherein performing reasoning analysis comprises performing a Bayesian network belief update algorithm.

14. The method of claim 11, wherein performing reasoning analysis comprises performing a predictive analysis using an inference algorithm.

15. The method of claim 11, further comprising:
modifying the unconstrained causal domain model to define a query.

16. The method of claim 11, further comprising:
validating the unconstrained causal domain model.

17. The method of claim 11, further comprising:
updating the unconstrained causal domain model.

18. The method of claim 11, further comprising acquiring the text for analyzing using the directed acyclic graph Bayesian network formalism, wherein acquiring the text comprises:
mining external sources for documents;
retrieving the mined documents from the external sources; and
extracting the text from the retrieved documents.

19. The method of claim 18, further comprising processing the text.

20. The method of claim 19, wherein processing the text comprises:
relevance filtering the text for relevance to the unconstrained causal domain model; and
event filtering the text for events associated with the unconstrained causal domain model.

21. The method of claim 19, wherein processing the text uses a common sense knowledge base, and wherein the common sense knowledge base is generated by:
extracting knowledge from a corpus of text, wherein the extracted knowledge is transformed into formal logic representing the extracted knowledge; and
manually capturing knowledge, wherein the captured knowledge is transformed into formal logic representing the captured knowledge.

22. A computer-readable medium encoded with a computer program for causing a processor to support a decision using an unconstrained causal domain model, the computer program comprising:
a first code for causing the processor to provide the unconstrained causal domain model;
a second code for causing the processor to transform the unconstrained causal domain model into a directed acyclic graph Bayesian network formalism with minimal information loss by eliminating cycles of the unconstrained causal domain model by computing information gain and eliminating influence arcs of the unconstrained causal domain model that minimizes information loss and store, on a computer-readable medium, the directed acyclic graph Bayesian network formalism; and
a third code for causing the processor to analyze text using the directed acyclic graph Bayesian network formalism to derive text profiles and store, on a computer-readable medium, the text profiles;
a fourth code for causing the processor to perform reasoning analysis of the text profiles according to the directed acyclic graph Bayesian network formalism.

23. The computer-readable medium of claim 22, wherein the computer program further comprises:
a fifth code for causing the processor to modify the unconstrained causal domain model to define a query.

24. The computer-readable medium of claim 22, wherein the computer program further comprises:
a sixth code for causing the processor to validate the unconstrained causal domain model.

25. The computer-readable medium of claim 22, wherein the computer program further comprises:
a seventh code for causing the processor to acquire the text for analyzing using the directed acyclic graph Bayesian network formalism.

26. The computer-readable medium of claim 25, wherein the seventh code comprises:
an eighth code for causing the processor to mine external sources for documents;
a ninth code for causing the processor to retrieve the mined documents from the external sources; and
a tenth code for causing the processor to acquire the text from the retrieved documents.

27. The computer-readable medium of claim 25, wherein the seventh code comprises:
an eleventh code for causing the processor to process the text to derive the processed text.

28. The computer-readable medium of claim 27, wherein the eleventh code comprises:
a twelfth code for causing the processor to filter the text for relevance to the unconstrained causal domain model; and
a thirteenth code for causing the processor to filter the text for events associated with the unconstrained causal domain model.

29. The computer-readable medium of claim 22, wherein the fourth code is further configured to derive a result, and further comprising a fifth code for causing the processor to electronically present a display identifying the result of the fourth code, providing a user the ability to use the result in a decision making process.

* * * * *

UNITED STATES PATENT AND TRADEMARK OFFICE
CERTIFICATE OF CORRECTION

PATENT NO. : 7,644,053 B2
APPLICATION NO. : 11/070452
DATED : January 5, 2010
INVENTOR(S) : Kipersztok et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this

Sixteenth Day of November, 2010

David J. Kappos
*Director of the United States Patent and Trademark Office*